(12) United States Patent
Endo et al.

(10) Patent No.: US 6,749,768 B2
(45) Date of Patent: Jun. 15, 2004

(54) MAGNETIC FERRITE POWDER, MAGNETIC FERRITE SINTER, LAYERED FERRITE PART, AND PROCESS FOR PRODUCING LAYERED FERRITE PART

(75) Inventors: Masami Endo, Katori-gun (JP); Atsuyuki Nakano, Inba-gun (JP)

(73) Assignee: TDK Corporation, Tokyo (JP)

( * ) Notice: Subject to any disclaimer, the term of this patent is extended or adjusted under 35 U.S.C. 154(b) by 305 days.

(21) Appl. No.: 10/009,075

(22) PCT Filed: Apr. 27, 2001

(86) PCT No.: PCT/JP01/03699

§ 371 (c)(1),
(2), (4) Date: Feb. 14, 2002

(87) PCT Pub. No.: WO01/84566

PCT Pub. Date: Nov. 8, 2001

(65) Prior Publication Data

US 2004/0069969 A1 Apr. 15, 2004

(30) Foreign Application Priority Data

| Apr. 28, 2000 | (JP) | 2000-131271 |
| Feb. 6, 2001 | (JP) | 2001-030250 |
| Feb. 23, 2001 | (JP) | 2001-049276 |

(51) Int. Cl.$^7$ .............. H01F 1/34; C04B 35/26
(52) U.S. Cl. ............ 252/62.63; 252/62.6; 252/62.64; 428/611; 36/36; 36/200; 36/83
(58) Field of Search ............ 336/200, 83; 428/611; 252/62.63, 62.6, 62.64

(56) References Cited

U.S. PATENT DOCUMENTS

6,127,296 A  * 10/2000 Uchikoba ............ 501/32
6,533,956 B2 *  3/2003 Nakano et al. ...... 252/62.64
2003/0224154 A1 * 12/2003 Umemoto et al. ..... 428/210

FOREIGN PATENT DOCUMENTS

| JP | 09-110432 | * | 4/1997 |
| JP | 09-167703 | * | 6/1997 |

* cited by examiner

Primary Examiner—C. Melissa Koslow
(74) Attorney, Agent, or Firm—Pearne & Gordon LLP

(57) ABSTRACT

Provided is magnetic ferrite powder in which a peak intensity ratio of Z phase ($M_3Me_2Fe_{24}O_{41}$: M=one or more kinds of alkaline-earth metal, Me=one or more kinds from Co, Ni, Mn, Zn, Mg and Cu) of hexagonal ferrite is 30% or higher in X-ray diffraction and a peak value of a grain size distribution is in a range from 0.1 μm to 3 μm.

17 Claims, 45 Drawing Sheets

FIG. 27
(a)
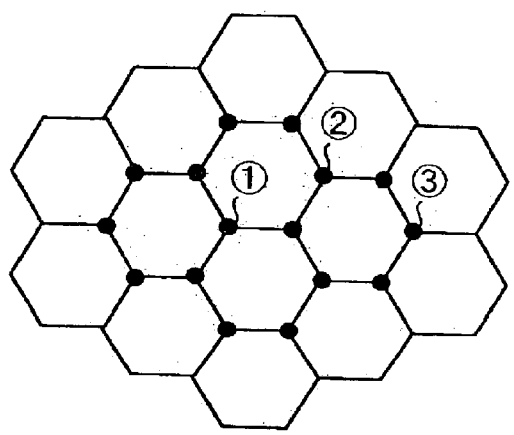
(b)
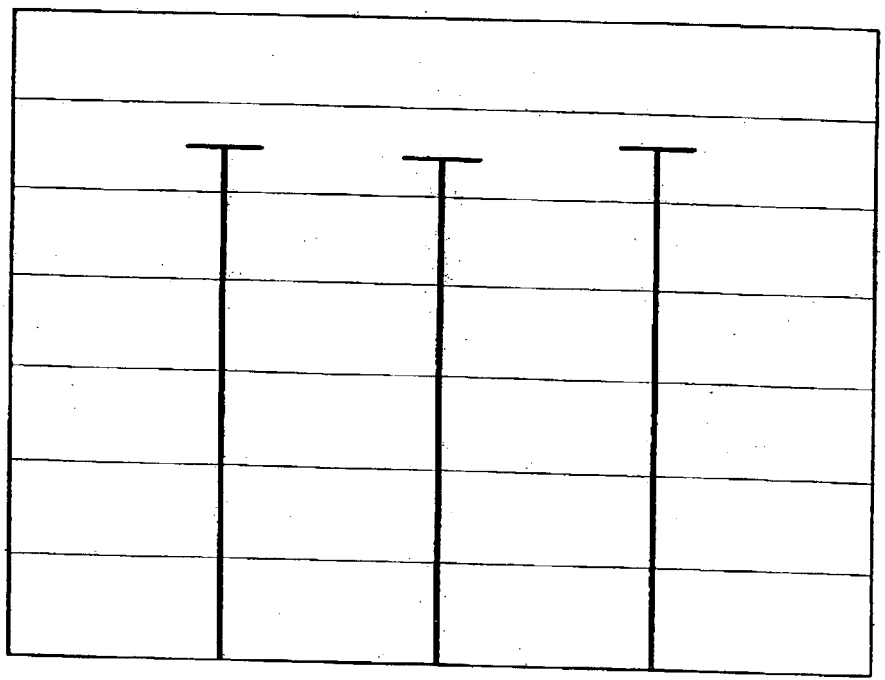
① ② ③

FIG. 28
(a)
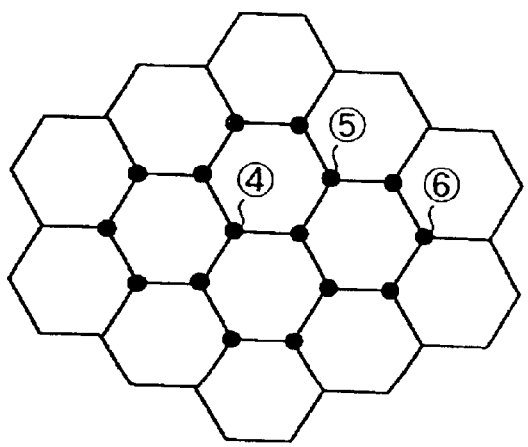
(b)
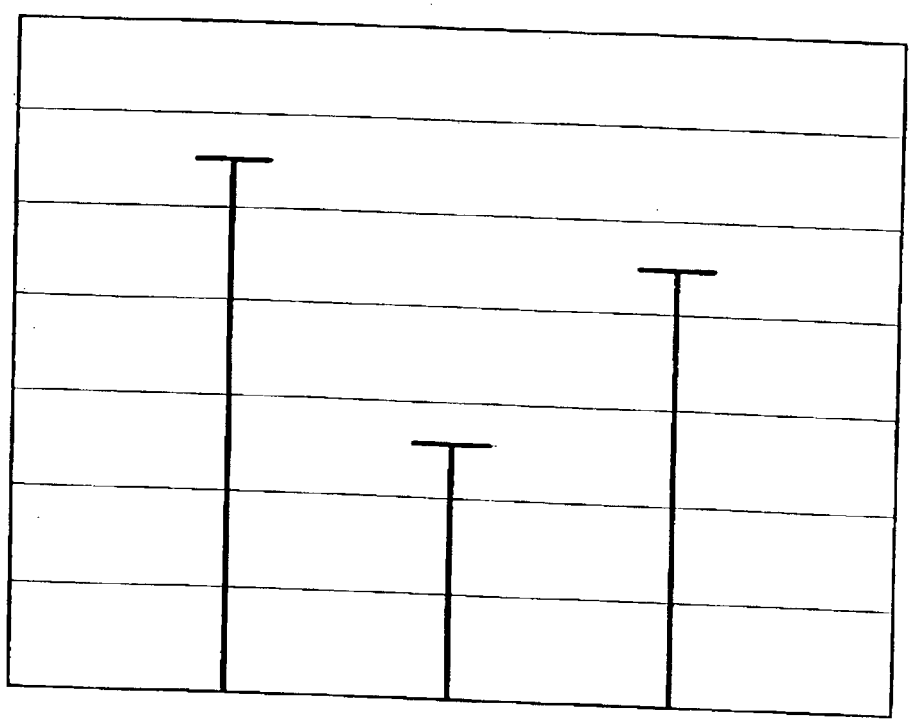
④  ⑤  ⑥

FIG.32

| Sample No. | Fe$_2$O$_3$ (mol%) | BaCO$_3$ (mol%) | Co$_3$O$_4$ (mol%) | CuO (wt%) | Bi$_2$O$_3$ (wt%) | Peak Value Of Grain Size Distribution | Note |
|---|---|---|---|---|---|---|---|
| 1 | 68.7 | 21.035 | 10.265 | — | — | — | Hexagonal Ferrite |
| 2 | 68.7 | 21.035 | 10.265 | 5.00 | 5.00 | 1.0 μm | Hexagonal Ferrite |
| 3 | 68.7 | 21.035 | 10.265 | 5.00 | 5.00 | 1.65 μm | Hexagonal Ferrite |
| 4 | 68.7 | 21.035 | 10.265 | 5.00 | 5.00 | 3.3 μm | Hexagonal Ferrite |

FIG.33

| Sample No. | Fe$_2$O$_3$ (mol%) | NiO (mol%) | CuO (mol%) | ZnO (mol%) | CoO (wt%) | Note |
|---|---|---|---|---|---|---|
| 5 | 48.6 | 44.9 | 5.10 | 1.4 | 0.2 | NiCuZn Ferrite |

FIG.34

| Raw Material Powder | Specific Surface Area (m$^2$/g) |
|---|---|
| Fe$_2$O$_3$ | 5.5 |
| BaCO$_3$ | 10.6 |
| Co$_3$O$_4$ | 12 |
| CuO | 6.7 |
| NiO | 5 |
| MnO | 19 |
| ZnO | 5.2 |
| MgO | 9.8 |

FIG.35

| Specific Surface Area ($m^2/g$) | $\mu$ (100MHz) | Sintered Body Density ($g/cm^3$) | Shrinkage Rate (%) | Smoothness | Use As Paint | Note |
|---|---|---|---|---|---|---|
| 1 | 2.5 | 4.5 | 14 | × | ○ | Many Large Grains, Bad Sheet State Condition |
| 5 | 3.8 | 4.9 | 17.3 | ○ | ○ | |
| 10 | 3.7 | 5.18 | 18.46 | ○ | ○ | |
| 15 | 3.7 | 5.22 | 18.5 | ○ | ○ | |
| 20 | 3.7 | 5.24 | 18.6 | ○ | ○ | |
| 25 | 3.7 | 5.25 | 18.58 | ○ | ○ | |
| 35 | 3.7 | 5.23 | 18.8 | ○ | × | Paint Becomes Gel |

FIG.36

| Sample No. | Fe$_2$O$_3$ (mol%) | BaCO$_3$ (mol%) | Co$_3$O$_4$ (mol%) | NiO (mol%) | MnO (mol%) | ZnO (mol%) | MgO (mol%) | CuO (wt%) | Bi$_2$O$_3$ (wt%) | Note |
|---|---|---|---|---|---|---|---|---|---|---|
| 6 | 68.7 | 21.035 | 10.162 | 0.103 | — | — | — | 5.00 | 5.00 | A Portion Of Co$_3$O$_4$ Was Substituted With NiO |
| 7 | 68.7 | 21.035 | 9.752 | 0.513 | — | — | — | 5.00 | 5.00 | |
| 8 | 68.7 | 21.035 | 7.699 | 2.566 | — | — | — | 5.00 | 5.00 | |
| 9 | 68.7 | 21.035 | 5.133 | 5.133 | — | — | — | 5.00 | 5.00 | |
| 10 | 68.7 | 21.035 | 10.162 | — | 0.103 | — | — | 5.00 | 5.00 | A Portion Of Co$_3$O$_4$ Was Substituted With MnO |
| 11 | 68.7 | 21.035 | 9.752 | — | 0.513 | — | — | 5.00 | 5.00 | |
| 12 | 68.7 | 21.035 | 7.699 | — | 2.566 | — | — | 5.00 | 5.00 | |
| 13 | 68.7 | 21.035 | 5.133 | — | 5.133 | — | — | 5.00 | 5.00 | |
| 14 | 68.7 | 21.035 | 10.162 | — | — | 0.103 | — | 5.00 | 5.00 | A Portion Of Co$_3$O$_4$ Was Substituted With ZnO |
| 15 | 68.7 | 21.035 | 9.752 | — | — | 0.513 | — | 5.00 | 5.00 | |
| 16 | 68.7 | 21.035 | 7.699 | — | — | 2.566 | — | 5.00 | 5.00 | |
| 17 | 68.7 | 21.035 | 5.133 | — | — | 5.133 | — | 5.00 | 5.00 | |
| 18 | 68.7 | 21.035 | 10.162 | — | — | — | 0.103 | 5.00 | 5.00 | A Portion Of Co$_3$O$_4$ Was Substituted With MgO |
| 19 | 68.7 | 21.035 | 9.752 | — | — | — | 0.513 | 5.00 | 5.00 | |
| 20 | 68.7 | 21.035 | 7.699 | — | — | — | 2.566 | 5.00 | 5.00 | |
| 21 | 68.7 | 21.035 | 5.133 | — | — | — | 5.133 | 5.00 | 5.00 | |

FIG.37

| Sample No. | Fe$_2$O$_3$ (mol%) | BaCO$_3$ (mol%) | Co$_3$O$_4$ (mol%) | CuO (mol%) | Bi$_2$O$_3$ (wt%) | CuO (wt%) | Note |
|---|---|---|---|---|---|---|---|
| 22 | 68.7 | 21.035 | 9.752 | 0.513 | 5.00 | 5.00 | A Portion Of Co$_3$O$_4$ Was Substituted With CuO By 5% |
| 23 | 68.7 | 21.035 | 7.699 | 2.566 | 5.00 | 5.00 | A Portion Of Co$_3$O$_4$ Was Substituted With CuO By 25% |
| 24 | 68.7 | 21.035 | 5.133 | 5.133 | 5.00 | 5.00 | A Portion Of Co$_3$O$_4$ Was Substituted With CuO By 50% |
| 25 | 68.7 | 21.035 | 2.566 | 7.699 | 5.00 | 5.00 | A Portion Of Co$_3$O$_4$ Was Substituted With CuO By 75% |

FIG.38

| Sample No. | Calcining Temprature (°C) | Sintered Body Density (g/cm$^3$) | Shrinkage Rate (%) | $\mu$ (500MHz) | $\varepsilon$ (1MHz) |
|---|---|---|---|---|---|
| 22 | 1200 | 5.06 | 15.46 | 1.77 | 40 |
| 22 | 1250 | 5.24 | 17.96 | 3.61 | 38 |
| 23 | 1200 | 5.01 | 16.00 | 1.70 | 43 |
| 23 | 1250 | 5.24 | 17.62 | 2.66 | 42 |
| 24 | 1200 | 5.10 | 16.35 | 1.80 | 43 |
| 24 | 1250 | 5.23 | 17.73 | 2.03 | 43 |
| 25 | 1200 | 5.12 | 16.46 | 1.84 | 45 |
| 25 | 1250 | — | — | — | — |

FIG.39

| Sampl No. | $Fe_2O_3$ (mol%) | $BaCO_3$ (mol%) | $Co_3O_4$ (mol%) | $SrCO_3$ (mol%) | $Bi_2O_3$ (wt%) | CuO (wt%) | Note |
|---|---|---|---|---|---|---|---|
| 26 | 68.7 | 20.614 | 10.162 | 0.421 | 5.00 | 5.00 | A Portion Of $BaCO_3$ Was Substituted With $SrCO_3$ By 2% |
| 27 | 68.7 | 20.194 | 10.162 | 0.841 | 5.00 | 5.00 | A Portion Of $BaCO_3$ Was Substituted With $SrCO_3$ By 4% |
| 28 | 68.7 | 19.352 | 10.162 | 1.683 | 5.00 | 5.00 | A Portion Of $BaCO_3$ Was Substituted With $SrCO_3$ By 8% |
| 29 | 68.7 | 17.669 | 10.162 | 3.366 | 5.00 | 5.00 | A Portion Of $BaCO_3$ Was Substituted With $SrCO_3$ By 16% |
| 30 | 68.7 | 16.828 | 10.162 | 4.207 | 5.00 | 5.00 | A Portion Of $BaCO_3$ Was Substituted With $SrCO_3$ By 20% |
| 31 | 68.7 | 15.776 | 10.162 | 5.259 | 5.00 | 5.00 | A Portion Of $BaCO_3$ Was Substituted With $SrCO_3$ By 25% |
| 32 | 68.7 | 13.673 | 10.162 | 7.362 | 5.00 | 5.00 | A Portion Of $BaCO_3$ Was Substituted With $SrCO_3$ By 35% |
| 33 | 68.7 | 10.517 | 10.162 | 10.517 | 5.00 | 5.00 | A Portion Of $BaCO_3$ Was Substituted With $SrCO_3$ By 50% |
| 34 | 68.7 | 5.259 | 10.162 | 15.776 | 5.00 | 5.00 | A Portion Of $BaCO_3$ Was Substituted With $SrCO_3$ By 75% |
| 35 | 68.7 | 0 | 10.162 | 21.035 | 5.00 | 5.00 | A Portion Of $BaCO_3$ Was Substituted With $SrCO_3$ By 100% |

FIG.40

| Sample No. | Calcining Temprature (°C) | Sintered Body Density (g/cm³) | Shrinkage Rate (%) | $\mu'$ (500MHz) | $\mu''$ (500MHz) |
|---|---|---|---|---|---|
| 26 | 1300 | 5.23 | 17.04 | 2.00 | 0.034 |
| 27 | 1300 | 5.21 | 17.00 | 2.03 | 0.042 |
| 28 | 1300 | 5.17 | 17.00 | 2.05 | 0.051 |
| 29 | 1300 | 4.92 | 15.85 | 2.44 | 0.073 |
| 30 | 1250 | 4.83 | 15.38 | 3.80 | 0.137 |
| 31 | 1250 | 4.69 | 15.01 | 4.01 | 0.260 |
| 32 | 1250 | 3.76 | 9.74 | 3.70 | 0.190 |
| 33 | 1250 | 2.97 | 2.62 | 2.54 | 0.010 |
| 34 | 1250 | 2.99 | 0.85 | 2.12 | 0.010 |
| 35 | 1250 | — | — | — | — |

FIG.41

| Sample No. | Fe$_2$O$_3$ (mol%) | BaCO$_3$ (mol%) | Co$_3$O$_4$ (mol%) | Glass A (wt%) | Glass B (wt%) | Note |
|---|---|---|---|---|---|---|
| 36 | 68.7 | 21.04 | 10.27 | — | 5.00 | Glass A: Zinc Borosilicate Glass |
| 37 | 68.7 | 21.04 | 10.27 | 5.00 | — | Glass B: Zinc Borosilicate Glass |

|  | SiO$_2$ | B$_2$O$_3$ | ZnO | Al$_2$O$_3$ | MnO | CoO | Li$_2$O | Na$_2$O | MgO | K$_2$O |
|---|---|---|---|---|---|---|---|---|---|---|
| Glass A | 10.38 | 44.55 | 35.65 | 2.13 | — | — | — | 7.07 | 0.19 | 0.04 |
| Glass B | 17.4 | 10.4 | 51.5 | — | 3.50 | 4.2 | 13 | — | — | — |

FIG.43

| Sample No. | Fe$_2$O$_3$ (mol%) | BaCO$_3$ (mol%) | Co$_3$O$_4$ (mol%) | Bi$_2$O$_3$ Based Glass (wt%) | | | Zinc Borosilicate Glass (wt%) | CuO (wt%) | Bi$_2$O$_3$ (wt%) |
|---|---|---|---|---|---|---|---|---|---|
| | | | | Sintering Aid A | Sintering Aid B | Sintering Aid C | | | |
| 38 | 68.7 | 21.035 | 10.265 | 3.00 | — | — | — | — | — |
| 39 | 68.7 | 21.035 | 10.265 | 5.00 | — | — | — | — | — |
| 40 | 68.7 | 21.035 | 10.265 | 7.00 | — | — | — | — | — |
| 41 | 68.7 | 21.035 | 10.265 | 9.00 | — | — | — | — | — |
| 42 | 68.7 | 21.035 | 10.265 | — | 3.00 | — | — | — | — |
| 43 | 68.7 | 21.035 | 10.265 | — | 5.00 | — | — | — | — |
| 44 | 68.7 | 21.035 | 10.265 | — | 7.00 | — | — | — | — |
| 45 | 68.7 | 21.035 | 10.265 | — | — | 3.00 | — | — | — |
| 46 | 68.7 | 21.035 | 10.265 | — | — | 5.00 | — | — | — |
| 47 | 68.7 | 21.035 | 10.265 | — | — | 7.00 | — | — | — |
| 48 | 68.7 | 21.035 | 10.265 | — | — | — | 3.00 | — | — |
| 49 | 68.7 | 21.035 | 10.265 | — | — | — | 5.00 | — | — |
| 50 | 68.7 | 21.035 | 10.265 | — | — | — | 7.00 | — | — |
| 51 | 68.7 | 21.035 | 10.265 | — | — | — | — | 3.00 | — |
| 52 | 68.7 | 21.035 | 10.265 | — | — | — | — | 5.00 | — |
| 53 | 68.7 | 21.035 | 10.265 | — | — | — | — | 7.00 | — |
| 54 | 68.7 | 21.035 | 10.265 | — | — | — | — | — | 5.00 |
| 55 | 68.7 | 21.035 | 10.265 | — | — | — | — | — | 10.00 |
| 56 | 68.7 | 21.035 | 10.265 | — | — | — | — | 5.00 | 5.00 |

|  |  | $Bi_2O_3$ | $B_2O_3$ | ZnO | $SiO_2$ | $Al_2O_3$ | $Na_2O$ | MgO | $K_2O$ |
|---|---|---|---|---|---|---|---|---|---|
| $Bi_2O_3$ Based Glass | Sintering Aid A | 83.83 | 13.75 | — | 1.94 | — | — | — | — |
| | Sintering Aid B | 49.51 | 19.68 | 27.51 | 2.4 | 0.12 | — | — | — |
| | Sintering Aid C | 39.89 | 19.57 | 37.3 | 2.32 | 0.16 | — | — | — |
| Zinc Borosilicate Glass | | — | 44.55 | 35.65 | 10.38 | 2.13 | 7.07 | 0.19 | 0.04 |

FIG.45

| Sample No. | Shrinkage Rate(%) | Sintered Body Density (g/cm³) | Additive | | | | | Calcining Temperature (°C) | Sintering Temperature (°C) |
|---|---|---|---|---|---|---|---|---|---|
| | | | Bi₂O₃ Based Glass | | | Zinc Borosilicate Glass | CuO | | |
| | | | Sintering Aid A | Sintering Aid B | Sintering Aid C | | | | |
| 38 | 14.77 | 4.50 | 3wt% | — | — | — | — | 1300 | 930 |
| 39 | 15.96 | 4.74 | 5wt% | — | — | — | — | 1300 | 930 |
| 40 | 16.42 | 4.84 | 7wt% | — | — | — | — | 1300 | 930 |
| 41 | 16.50 | 4.88 | 9wt% | — | — | — | — | 1300 | 930 |
| 42 | 11.89 | 4.22 | — | 3wt% | — | — | — | 1300 | 930 |
| 43 | 13.39 | 4.42 | — | 5wt% | — | — | — | 1300 | 930 |
| 44 | 14.04 | 4.53 | — | 7wt% | — | — | — | 1300 | 930 |
| 45 | 11.15 | 4.18 | — | — | 3wt% | — | — | 1300 | 930 |
| 46 | 12.66 | 4.37 | — | — | 5wt% | — | — | 1300 | 930 |
| 47 | 13.38 | 4.39 | — | — | 7wt% | — | — | 1300 | 930 |
| 48 | 12.30 | 4.49 | — | — | — | 3wt% | — | 1300 | 950 |
| 49 | 13.10 | 4.40 | — | — | — | 5wt% | — | 1300 | 950 |
| 50 | 14.12 | 4.35 | — | — | — | 7wt% | — | 1300 | 950 |

FIG.46

| Sample No. | Relative Resistivity (MΩ·cm) | $Bi_2O_3$ Based Glass (wt%) | | | CuO (wt%) | $Bi_2O_3$ (wt%) |
|---|---|---|---|---|---|---|
| | | Sintering Aid A | Sintering Aid B | Sintering Aid C | | |
| 38 | 360 | 3.00 | — | — | — | — |
| 39 | 770 | 5.00 | — | — | — | — |
| 40 | 940 | 7.00 | — | — | — | — |
| 41 | 840 | 9.00 | — | — | — | — |
| 42 | 75 | — | 3.00 | — | — | — |
| 43 | 310 | — | 5.00 | — | — | — |
| 44 | 910 | — | 7.00 | — | — | — |
| 45 | 51 | — | — | 3.00 | — | — |
| 46 | 140 | — | — | 5.00 | — | — |
| 47 | 310 | — | — | 7.00 | — | — |
| 51 | 51 | — | — | — | 3.00 | — |
| 52 | 37 | — | — | — | 5.00 | — |
| 53 | 18 | — | — | — | 7.00 | — |
| 54 | 21 | — | — | — | — | 5.00 |
| 55 | 18 | — | — | — | — | 10.00 |
| 56 | 24 | — | — | — | 5.00 | 5.00 |

FIG.47

| Sample No. | Fe$_2$O$_3$ (mol%) | BaCO$_3$ (mol%) | Co$_3$O$_4$ (mol%) | Additive | | | Note |
|---|---|---|---|---|---|---|---|
| | | | | Bi$_2$O$_3$ Based Glass (wt%) | CuO (wt%) | Zinc Borosilicate Glass (wt%) | |
| 38 | 68.7 | 21.035 | 10.265 | 3.00 | — | — | Sintering Aid A |
| 39 | 68.7 | 21.035 | 10.265 | 5.00 | — | — | |
| 40 | 68.7 | 21.035 | 10.265 | 7.00 | — | — | |
| 57 | 68.7 | 21.035 | 10.265 | 3.00 | 3.00 | — | |
| 58 | 68.7 | 21.035 | 10.265 | 5.00 | 5.00 | — | |
| 59 | 68.7 | 21.035 | 10.265 | 7.00 | 7.00 | — | |
| 42 | 68.7 | 21.035 | 10.265 | 3.00 | — | — | Sintering Aid B |
| 43 | 68.7 | 21.035 | 10.265 | 5.00 | — | — | |
| 44 | 68.7 | 21.035 | 10.265 | 7.00 | — | — | |
| 60 | 68.7 | 21.035 | 10.265 | 3.00 | 3.00 | — | |
| 61 | 68.7 | 21.035 | 10.265 | 5.00 | 5.00 | — | |
| 62 | 68.7 | 21.035 | 10.265 | 7.00 | 7.00 | — | |
| 45 | 68.7 | 21.035 | 10.265 | 3.00 | — | — | Sintering Aid C |
| 46 | 68.7 | 21.035 | 10.265 | 5.00 | — | — | |
| 47 | 68.7 | 21.035 | 10.265 | 7.00 | — | — | |
| 63 | 68.7 | 21.035 | 10.265 | 3.00 | 3.00 | — | |
| 64 | 68.7 | 21.035 | 10.265 | 5.00 | 5.00 | — | |
| 65 | 68.7 | 21.035 | 10.265 | 7.00 | 7.00 | — | |
| 48 | 68.7 | 21.035 | 10.265 | — | — | 3.00 | Comparative Example |
| 49 | 68.7 | 21.035 | 10.265 | — | — | 5.00 | |
| 50 | 68.7 | 21.035 | 10.265 | — | — | 7.00 | |

FIG.48

| Sample No. | Shrinkage Rate (%) | Sintered Body Density (g/cm³) | μ' (500MHz) | μ'' (500MHz) | Additive | | | |
|---|---|---|---|---|---|---|---|---|
| | | | | | CuO (wt%) | Sintering Aid A (wt%) | Sintering Aid B (wt%) | Sintering Aid C (wt%) |
| 38 | 14.77 | 4.50 | 2.67 | 0.05 | — | 3.0 | — | — |
| 39 | 15.96 | 4.74 | 2.52 | 0.04 | — | 5.0 | — | — |
| 40 | 16.42 | 4.84 | 2.25 | 0.03 | — | 7.0 | — | — |
| 57 | 15.92 | 4.77 | 3.12 | 0.08 | 3.0 | 3.0 | — | — |
| 58 | 16.77 | 4.92 | 3.08 | 0.08 | 5.0 | 5.0 | — | — |
| 59 | 16.69 | 4.91 | 1.92 | 0.03 | 7.0 | 7.0 | — | — |
| 42 | 11.89 | 4.22 | 3.37 | 0.03 | — | — | 3.0 | — |
| 43 | 13.39 | 4.42 | 3.60 | 0.04 | — | — | 5.0 | — |
| 44 | 14.04 | 4.53 | 3.37 | 0.04 | — | — | 7.0 | — |
| 60 | 14.12 | 4.52 | 3.47 | 0.15 | 3.0 | — | 3.0 | — |
| 61 | 15.81 | 4.79 | 3.80 | 0.39 | 5.0 | — | 5.0 | — |
| 62 | 16.31 | 4.87 | 2.72 | 0.17 | 7.0 | — | 7.0 | — |
| 45 | 11.15 | 4.18 | 3.46 | 0.02 | — | — | — | 3.0 |
| 46 | 12.66 | 4.37 | 3.81 | 0.09 | — | — | — | 5.0 |
| 47 | 13.38 | 4.39 | 3.43 | 0.07 | — | — | — | 7.0 |
| 63 | 13.50 | 4.46 | 3.55 | 0.18 | 3.0 | — | — | 3.0 |
| 64 | 15.23 | 4.70 | 3.88 | 0.42 | 5.0 | — | — | 5.0 |
| 65 | 15.54 | 4.73 | 2.88 | 0.223 | 7.0 | — | — | 7.0 |

FIG.49

| Sample No. | Permittivity ε | Bi₂O₃ Based Glass (wt%) | | | CuO (wt%) | Bi₂O₃ (wt%) |
|---|---|---|---|---|---|---|
| | | Sintering Aid A | Sintering Aid B | Sintering Aid C | | |
| 38 | 27 | 3.0 | — | — | — | — |
| 39 | 30 | 5.0 | — | — | — | — |
| 40 | 28 | 7.0 | — | — | — | — |
| 57 | 31 | 3.0 | — | — | 3.0 | — |
| 58 | 31 | 5.0 | — | — | 5.0 | — |
| 59 | 30 | 7.0 | — | — | 7.0 | — |
| 42 | 22 | — | 3.0 | | — | — |
| 43 | 25 | — | 5.0 | | — | — |
| 44 | 23 | — | 7.0 | | — | — |
| 60 | 26 | — | 3.0 | | 3.0 | — |
| 61 | 27 | — | 5.0 | | 5.0 | — |
| 62 | 27 | — | 7.0 | | 7.0 | — |
| 45 | 21 | — | — | 3.0 | — | — |
| 46 | 24 | — | — | 5.0 | — | — |
| 47 | 24 | — | — | 7.0 | — | — |
| 63 | 25 | — | — | 3.0 | 3.0 | — |
| 64 | 26 | — | — | 5.0 | 5.0 | — |
| 65 | 26 | — | — | 7.0 | 7.0 | — |
| 56 | 40 | — | — | — | 5.0 | 5.0 |

MAGNETIC FERRITE POWDER, MAGNETIC FERRITE SINTER, LAYERED FERRITE PART, AND PROCESS FOR PRODUCING LAYERED FERRITE PART

BACKGROUND OF THE INVENTION

1. Technical Field

The present invention relates to magnetic ferrite used in a multilayer ferrite chip component such as a multilayer ferrite chip bead and a multilayer inductor and used in an integrated multilayer component represented by an Lc integrated multilayer component, and to a multilayer ferrite chip component.

2. Background Art

A multilayer ferrite chip component and an integrated multilayer component (collectively referred to as a "multilayer ferrite chip component" in the specification) are used in various electric appliances because of a small volume and high reliability. The multilayer ferrite chip component is normally manufactured by the following process. A sheet or paste for a magnetic layer made of magnetic ferrite and paste for an internal electrode are made into a monolithic laminated strucure using a thick film stacking technology, and then sintered. Then, paste for an external electrode is printed or transferred on a surface of the sintered body obtained, and then baked. Note that sintering after obtaining the monolithic laminated strucure is referred to as co-firing. Ag or an Ag alloy is used as a material for the internal electrode because of their low resistivity. Accordingly, as for the magnetic ferrite material constituting the magnetic layer, it is an absolute condition that the material is capable of co-firing, in other words, capable of being sintered at a temperature lower than the melting point of Ag or an Ag alloy. Therefore, whether or not the magnetic ferrite can be sintered at a temperature lower than the melting point of Ag or an Ag alloy is a key to obtaining a multilayer ferrite chip component of high density and high-level characteristics.

NiCuZn ferrite is known as the magnetic ferrite that can be sintered at a temperature lower than the melting point of Ag or an Ag alloy. at a temperature lower than the melting point of Ag or an Ag alloy. Specifically, the NiCuZn ferrite using raw material powder with a specific surface area of about 6 $m^2/g$ or greater produced by fine milling can be sintered at a temperature lower than the melting point of Ag (961.93° C.). Accordingly, the NiCuZn ferrite is widely used in the multilayer ferrite chip components.

In recent years, hexagonal ferrite has drawn attention with an increase of a clock frequency. There are six kinds of the hexagonal ferrite, namely, an M type, a U type, a W type, an X type, a Y type and a Z type, which have characteristics different from cubic ferrite of an Mn based ferrite and an Ni based ferrite. Among these kinds, the Z type has a general formula of $M_3Me_2Fe_{24}O_{41}$. Here, M denotes alkaline-earth metal, and Me denotes bivalent metal ions. Among the Z types of the hexagonal ferrite, a Z type hexagonal ferrite containing cobalt metal ions has large anisotropy. Thus, the Z type hexagonal ferrite containing cobalt metallic ions is capable of having high permeability up to a frequency range higher than that of spinel ferrite. The Z type hexagonal ferrite containing cobalt metallic ions is referred to as $Co_2Z$.

Although the fact that the Z type hexagonal ferrite has an excellent high frequency characteristic has been known from before, it has not been put into practical use yet due to several problems. Specifically, phases of M, W and Y appear in the course of generation of Z phase, and generation of the different phases reduces the permeability. Moreover, it is also pointed out that sintered hexagonal ferrite of the Z type has low sintered body density. If the sintered body density is low, low mechanical strength of the sintered body when used as a surface mount component becomes a problem. In addition, the sintered body density and the permeability are closely related to each other, as the permeability itself is reduced if the sintered body density is low. Thus, original magnetic properties cannot be exerted.

Japanese Patent Laid-Open No. Hei9 (1997)-110432 gazette discloses a hexagonal ferrite material in which sintered body density thereof is increased and the permeability reduction in high frequency region is suppressed. The hexagonal ferrite material disclosed in Japanese Patent Laid-Open No. Hei9 (1997)-110432 gazette is characterized in that $SiO_2$ and CaO are added by predetermined amounts. However, the hexagonal ferrite material disclosed in Japanese Patent Laid-Open No. Hei9 (1997)-110432 gazette is based on the assumption that the material is sintered at a temperature in a range from 1150° C. to 1350° C. Accordingly, the co-firing cannot be performed, and application to the multilayer ferrite chip components is difficult.

Japanese Patent Laid-Open No. Hei9 (1997)-167703 gazette discloses an approach to a low-temperature sintering of a hexagonal ferrite material. Specifically, the gazette points out that a composition of $(Ba, Sr, Pb)_3(Co_{1-x}Cu_x)_2Fe_{24}O_{41}$, that is, substitution of a portion of the alkaline-earth metal with Pb and also substitution of a portion of Co with Cu, allows the hexagonal ferrite material to be dense at a low temperature. However, the hexagonal ferrite material obtained by Japanese Patent Laid-Open No. Hei9 (1997)-167703 gazette has the phases of M, Y, W, X and U as main phases, and has not obtained the hexagonal ferrite material having the Z phase as a main phase, which is highly permeable to the high frequency range.

As described above, a hexagonal ferrite material capable of sintering at a low temperature and having the Z phase as a main phase has not been obtained yet.

SUMMARY OF THE INVENTION

Disclosure of the Invention

An object of the present invention is to provide a hexagonal ferrite material that can be applied to a multilayer ferrite chip component because of capability of low-temperature sintering and that has Z phase as a main phase, and a multilayer ferrite chip component using such material.

Conventionally, hexagonal ferrite of the Z type usable in a GHz-range has not been able to sinter at a temperature lower than the melting point of Ag, which constitutes a material for an internal electrode. This is because magnetic properties cannot be obtained unless the ferrite is sintered at a high temperature in a range from 1250° C. to 1350° C. Therefore, it has not been possible to obtain a multilayer ferrite chip component which requires co-firing with Ag by using the hexagonal ferrite of the Z type. Although a hexagonal ferrite material that can be sintered at a low temperature has been proposed, such material does not have Z phase as a main phase. The inventors therefore examined a calcining temperature, a grain size distribution of powder before sintering, a powder specific surface area, and an additive to a main composition, and solved the foregoing problems.

The present invention provides magnetic ferrite powder in which a peak intensity ratio of the Z phase of the hexagonal ferrite ($M_3Me_2Fe_{24}O_{41}$: M=one or more kinds of alkaline-earth metal, Me=one or more kinds selected from Co, Ni, Mn, Zn, Mg and Cu) is 30% or higher in X-ray diffraction and a peak value of grain size distribution is within a range from 0.1 μm to 3 μm.

The magnetic ferrite powder of the present invention can be added with one or more kinds selected from borosilicate glass, zinc borosilicate glass, $Bi_2O_3$ based glass, CuO and $Bi_2O_3$, by 0.5 wt % to 20 wt %. Among the above, it is preferable to add CuO and $Bi_2O_3$ by 0.5 wt % to 20 wt % in total, or to add $Bi_2O_3$ based glass and CuO by 1 wt % to 20 wt % in total. In particular, it is preferable to add $Bi_2O_3$ based glass by 3 wt % to 7 wt % and CuO by 3 wt % to 7 wt %.

The present invention also provides magnetic ferrite powder in which Z phase (M=Ba, Me=one or more kinds selected from Co, Ni, Mn, Zn, Mg and Cu) indicated as $M_3Me_2Fe_{24}O_{41}$ forms a main phase and a powder specific surface area is 5 m²/g to 30 m²/g. In the magnetic ferrite powder of the present invention, the magnetic ferrite having an excellent high frequency characteristic can be obtained by substituting a portion of Ba with Sr, and calcining is enabled at a temperature lower than a conventional calcining temperature.

The present invention further provides a sintered body of magnetic ferrite in which Z phase (M=Ba, Me=one or more kinds selected from Co, Ni, Mn, Zn, Mg and Cu) indicated as $M_3Me_2Fe_{24}O_{41}$ forms a main phase, CuO and $Bi_2O_3$ are included by 0.5 wt % to 20 wt % in total, CuO mainly exists in grains, and $Bi_2O_3$ mainly exists in grain boundaries. In this sintered body, CuO and $Bi_2O_3$ effectively function to sintering at a temperature lower than 960° C. In addition, in the sintered body of magnetic ferrite of the present invention, a portion of Ba can be substituted with Sr.

Moreover, the present invention provides a sintered body of magnetic ferrite in which Z phase (M=Ba, Me=one or more kinds selected from Co, Ni, Mn, Zn, Mg and Cu) indicated as $M_3Me_2Fe_{24}O_{41}$ forms a main phase, and $Bi_2O_3$ based glass and CuO are added by 1 wt % to 20 wt % in total.

Furthermore, the present invention provides a multilayer ferrite chip component in which a magnetic ferrite layer and an internal electrode are stacked alternately, and which comprises an external electrode electrically connected with the internal electrode. The magnetic ferrite layer has the Z phase of the hexagonal ferrite ($M_3Me_2Fe_{24}O_{41}$: M=one or more kinds of alkaline-earth metal, Me=one or more kinds selected from Co, Ni, Mn, Zn, Mg and Cu) as a main phase in X-ray diffraction, and is constituted of a sintered body of magnetic ferrite having a mean grain size of 1 to 5 μm. The internal electrode is constituted of Ag or an Ag alloy.

The multilayer ferrite chip component of the present invention is the one in which the magnetic ferrite layer and the internal electrode layer are co-fired, and density of the magnetic ferrite layer can be made to be 5 g/cm³ or higher. Moreover, in the multilayer ferrite chip component of the present invention, it is preferable that the magnetic ferrite layer includes CuO and $Bi_2O_3$ by 0.5 wt % to 20 wt % in total, CuO mainly exists within grains, and $Bi_2O_3$ mainly exists within grain boundaries. In addition, in the multilayer ferrite chip component of the present invention, it is preferable that the magnetic ferrite layer includes $Bi_2O_3$ based glass and CuO by 1 wt % to 20 wt % in total.

The multilayer ferrite chip component of the present invention described above can be obtained by a manufacturing method of the multilayer ferrite chip component of the present invention as follows. Specifically, it is a manufacturing method of a multilayer ferrite chip component in which a magnetic ferrite layer and an internal electrode are stacked with each other. The method comprises the steps of mixing raw material powder of magnetic ferrite; calcining the mixed raw material powder in a temperature range of 1200° C. or higher; milling an obtained calcined body so as to make a peak value of the grain size distribution fall into a range from 0.1 μm to 3 μm; obtaining a sheet or paste for forming a magnetic layer by using obtained milled powder; obtaining a laminated green body by alternately stacking the sheet or the paste and a material for the internal electrode; and sintering the laminated green body at a temperature lower than 960° C. Here, the magnetic ferrite layer consists of a sintered body of magnetic ferrite having Z phase ($M_3Me_2Fe_{24}O_{41}$: M=one or more kinds of alkaline-earth metal, Me=one or more kinds selected from Co, Ni, Mn, Zn, Mg and Cu) of hexagonal ferrite as a main phase in X-ray diffraction. In the manufacturing method of the present invention, it is preferable that a powder specific surface area of each raw material powder is 4.5 m²/g or greater, and a powder specific surface area of the milled powder is in a range from 8 to 20 m²/g.

BRIEF DESCRIPTION OF THE DRAWINGS

FIGS. 27(a) and (b) are conceptional views of the microstructure of sintered body in the case where $Bi_2O_3$ based glass is added.

FIGS. 28(a) and (b) are conceptional views of the microstructure of sintered body in the case where each material constituting $Bi_2O_3$ based glass is independently added.

FIG. 32 is a table showing the compound composition of a ferrite material used in Example 1.

FIG. 33 is a table showing another compound composition of the ferrite material used in Example 1.

FIG. 34 is a table showing the specific surface area of various kinds of raw material powder used in Example 1.

FIG. 35 is a table showing the evaluation results of Example 2.

FIG. 36 is a table showing the compound composition of the ferrite material used in Example 3.

FIG. 37 is a table showing the compound composition of the ferrite material used in Example 4.

FIG. 38 is a table showing the various evaluation results of Example 4.

FIG. 39 is a table showing the compound composition of the ferrite material used in Example 5.

FIG. 40 is a table showing the various evaluation results of Example 5.

FIG. 41 is a table showing the compound composition of the ferrite material used in Example 6.

FIG. 42 is a table showing the composition of zinc borosilicate glass used in Example 6.

FIG. 43 is a table showing the compound composition of the ferrite material used in Example 7.

FIG. 44 is a table showing the compositions of sintering aids A to C and the zinc borosilicate glass used in Example 7.

FIG. 45 is a table showing the various evaluation results of Example 7.

FIG. 46 is a table showing the evaluation results of the relative resistivity of Example 7.

FIG. 47 is a table showing the compound composition of the ferrite material used in Example 8.

FIG. 48 is a table showing the various evaluation results of Example 8.

FIG. 49 is a table showing the measurement results of permittivity, performed in Example 9.

DETAILED DESCRIPTION OF THE PREFFERED EMBODIMENTS

Figure 1:
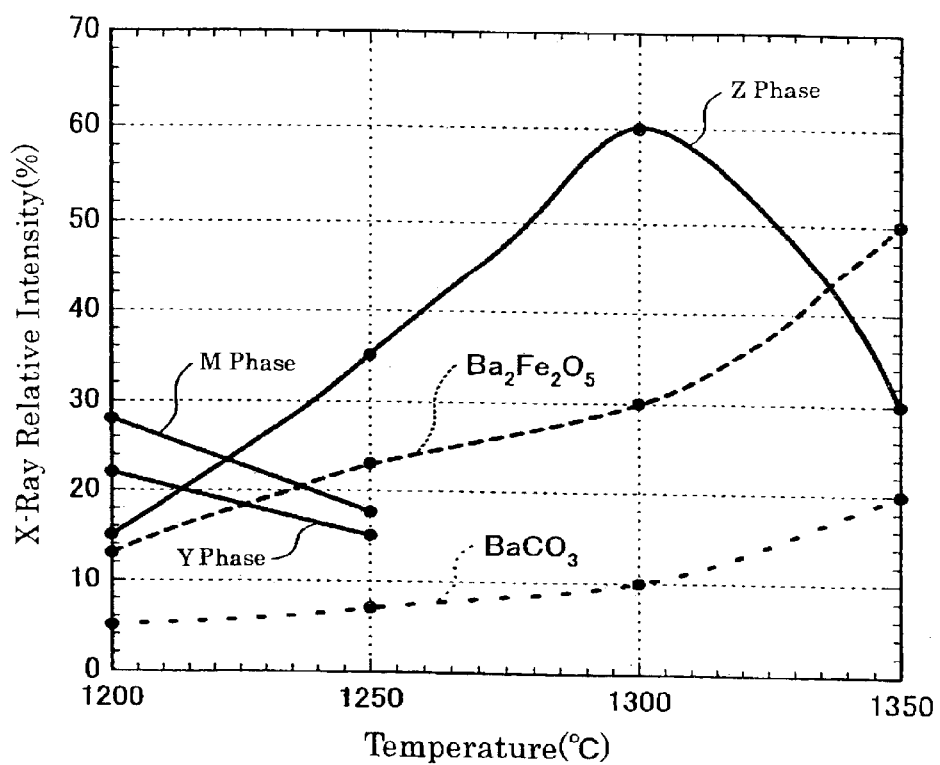
FIG. 1 is a graph showing the influence of the calcining temperature on phase changes.

Embodiments of the present invention will be described below.

In the present invention, the peak intensity ratio of the Z phase indicated by $M_3Me_2Fe_{24}O_{41}$ is 30% or higher, which constitutes a main phase. Although it is desirable that the peak intensity ratio of the Z phase is high, approximately 80% is the limit in the current manufacturing technology.

As raw material powder to obtain the magnetic ferrite powder and the sintered body of the present invention, $Fe_2O_3$ powder, and oxide or carbonate powder for M and Me are prepared. M is the alkaline-earth metal such as Ba and Sr, and Ba is particularly desirable. When Ba is selected as M, it is desirable that Ba is added as $BaCO_3$ powder. However, a portion of Ba can be substituted with Sr as shown in the after-mentioned examples. Herein, the ionic radius of $Ba^{2+}$ is 0.136 nm while the ionic radius of $Sr^{2+}$ 0.116 nm, and the ionic radiuses of the both are greatly different. Accordingly, anisotropy increases by substituting a portion of Ba with Sr, allowing the expansion of frequency range. When substituting a portion of Ba with Sr, the amount of substitution can be set 5 to 80%, and a desirable amount of substitution is 20 to 35%. Substitution in this range makes it possible to obtain a higher permeability, and has an effect that the frequency range shifts to a higher frequency side. The inventors of the present invention also found out that the melting point becomes lower by substituting Ba with Sr. When Ba is substituted with Sr by 20% or more, the calcining temperature can be reduced by about 50° C. Thus, the obtained calcined material can be arranged in a desired grain size distribution in the milling process after the calcining, which contributes to a mass production.

In addition, it is desirable that Me is one or more kinds from Co, Ni, Mn, Zn, Mg and Cu, and Co is particularly desirable. However, as shown in the examples described later, the effect is obtained that $\mu''$ shifts to the high frequency side when a portion of Co is substituted with one or more kinds of Ni, Mn, Zn, Mg and Cu. In the case where a portion of Co is substituted with Cu having an ionic radius closer to that of Co, the permeability shifts to the high frequency side as the amount of substitution of Cu increases, and there is an excellent effect in noise absorption in the GHz-range. Me can be added as $Co_3O_4$, NiO, MnO, ZnO, MgO and CuO powder. However, these are examples and do not exclude the addition in other forms.

In the present invention, composition may be selected in accordance with an object. To obtain the permeability excellent in a high frequency characteristic, a compound composition of: $Fe_2O_3$ from 65 to 75 mol %; $BaCO_3$ from 17 to 27 mol % (or a total amount of $BaCO_3$ and $SrCO_3$ from 17 to 27 mol %); and one or more kinds of $Co_3O_4$, NiO, MnO, ZnO, MgO and CuO from 5 to 15 mol % is desirable. More desirably, the compound composition is: $Fe_2O_3$ from 67 to 70 mol %; $BaCO_3$ and the like from 18 to 20 mol %; and $Co_3O_4$ and the like from 7 to 12 mol %.

Magnetic properties of the magnetic ferrite has very strong composition dependency, and the permeability and a quality factor Q are low and insufficient outside the above-described ranges. Specifically, for example, targeting magnetic ferrite cannot be generated if a composition range goes off the composition range described above. Thus, the high permeability with excellent frequency characteristic cannot be obtained.

In the magnetic ferrite powder of the present invention, the peak value of its mean grain size distribution (simply referred to as a grain size distribution in the specification) shall be in the range from 0.1 μm to 3 μm. This is because the co-firing is difficult if the grain size distribution exceeds 3 μm. However, if under 0.1 μm, it becomes difficult to form paste paint and sheet paint necessary in obtaining the multilayer ferrite chip components of the present invention. In other words, the paint becomes gel. A desirable peak value of the grain size distribution is from 0.5 μm to 2.0 μm, and a more desirable peak value of the grain size distribution is from 0.8 μm to 1.5 μm.

Since a generated phase of the magnetic ferrite of the present invention is determined by the calcining temperature, the calcining temperature is particularly important. In other words, the calcining must be performed at a temperature of 1200° C. or higher to make the peak intensity ratio of the Z phase be 30% or higher, or to make the Z phase a main phase. However, when the calcining is performed at the high temperature, grains are hardened to cause the milling process to take a long time, and a composition deviation and the like occur. Accordingly, particular attention is required. The Z phase is not generated if the calcining is performed in the temperature range beyond 1350° C., and the frequency characteristic of excellent permeability cannot be obtained. Therefore, a desirable calcining temperature is from 1250° C. to 1330° C. However, since the melting point lowers when Ba is substituted with Sr by 20% or more as described above, a desirable calcining temperature in this case is from 1230° C. to 1280° C.

Further, in the case where Co and Cu are selected as Me and the total amount thereof is set from 5 to 15 mol %, the peak intensity ratio of the Z phase becomes 30% or higher when the temperature is near 1250° C. due to the low temperature sintering effect of Cu. Accordingly, it can be concluded that a desirable calcining temperature in this case is also from 1230° C. to 1280° C.

Duration of calcining is not particularly limited, but may be appropriately decided depending on the composition and the calcining temperature. 0.1 hour to 5 hours is sufficient.

For the co-firing, or the low temperature sintering, it is important to add one or more kinds of borosilicate glass, zinc borosilicate glass, $Bi_2O_3$ based glass, CuO and $Bi_2O_3$ by 0.5 wt % to 20 wt % as an additive component. Among the above, it is effective that CuO and $Bi_2O_3$ are added in combination, and the amount of addition is set from 1 wt % to 10 wt %, more desirably from 3 wt % to 8 wt %. Both CuO and $Bi_2O_3$ are effective in the low temperature sintering, and in the sintered body, the former mainly exists within the grains and the latter mainly exists on the grain boundaries. Herein, although CuO can be used when selecting Cu as Me, CuO to be added as the additive component for the low temperature sintering is added after the calcining, while CuO as Me is added before the calcining.

Also, $Bi_2O_3$ based glass is a desirable additive in the present invention. The inventors executed various examinations for additives to the main composition, and found out that shrinkage rate at the time of heating was improved by adding $Bi_2O_3$ based glass, that is, $Bi_2O_3$ based glass effectively contributes to the low temperature sintering. Here, the shrinkage rate serves as a guidepost for easiness of sintering. It is considered that, at the same temperature, the higher the shrinkage rate, the easier the sintering can be performed. Moreover, the inventors found out not only that $Bi_2O_3$ based glass is effective in the low temperature sintering, but also that an imaginary part $\mu''$ (hereinafter, referred to as $\mu''$ appropriately) of a complex permeability shifts to the high frequency side when $Bi_2O_3$ based glass is added. Therefore, the magnetic ferrite having excellent high frequency characteristic and capability for the low temperature sintering can be obtained by the use of $Bi_2O_3$ based glass.

Note that $Bi_2O_3$ based glass in the present invention refers to glass in which glass component includes $Bi_2O_3$ by 20 wt % to 90 wt %. A desirable amount of addition of $Bi_2O_3$ based glass is from 0.5 wt % to 12 wt %. When $Bi_2O_3$ based glass is added in this range, the shrinkage rate that is the guidepost for easiness of sintering improves. Thus, lowering of the sintering temperature can be attained.

In the magnetic ferrite material of the present invention, it is particularly effective for the co-firing when $Bi_2O_3$ based glass and CuO are added in combination as a sintering aid. Specifically, $Bi_2O_3$ based glass and CuO can be added by 1 wt % to 20 wt % in total. Although that the low temperature sintering can be performed by using CuO is already known, there are cases where the magnetic properties are reduced when CuO is singly added as a sintering aid. However, the magnetic ferrite capable of the low temperature sintering can be obtained while maintaining predetermined magnetic properties by adding $Bi_2O_3$ based glass and CuO in combination. Particularly when $Bi_2O_3$ based glass and CuO are added by 3 wt % to 15 wt % in total, the shrinkage rate that is the guidepost for easiness of sintering improves. Alternatively, when $Bi_2O_3$ based glass is added by 3 wt % to 7 wt % and CuO is added by 3 wt % to 7 wt %, $\mu''$ shifts to the high frequency side. Accordingly, the magnetic ferrite of excellent high frequency characteristic can be obtained.

Figure 29:
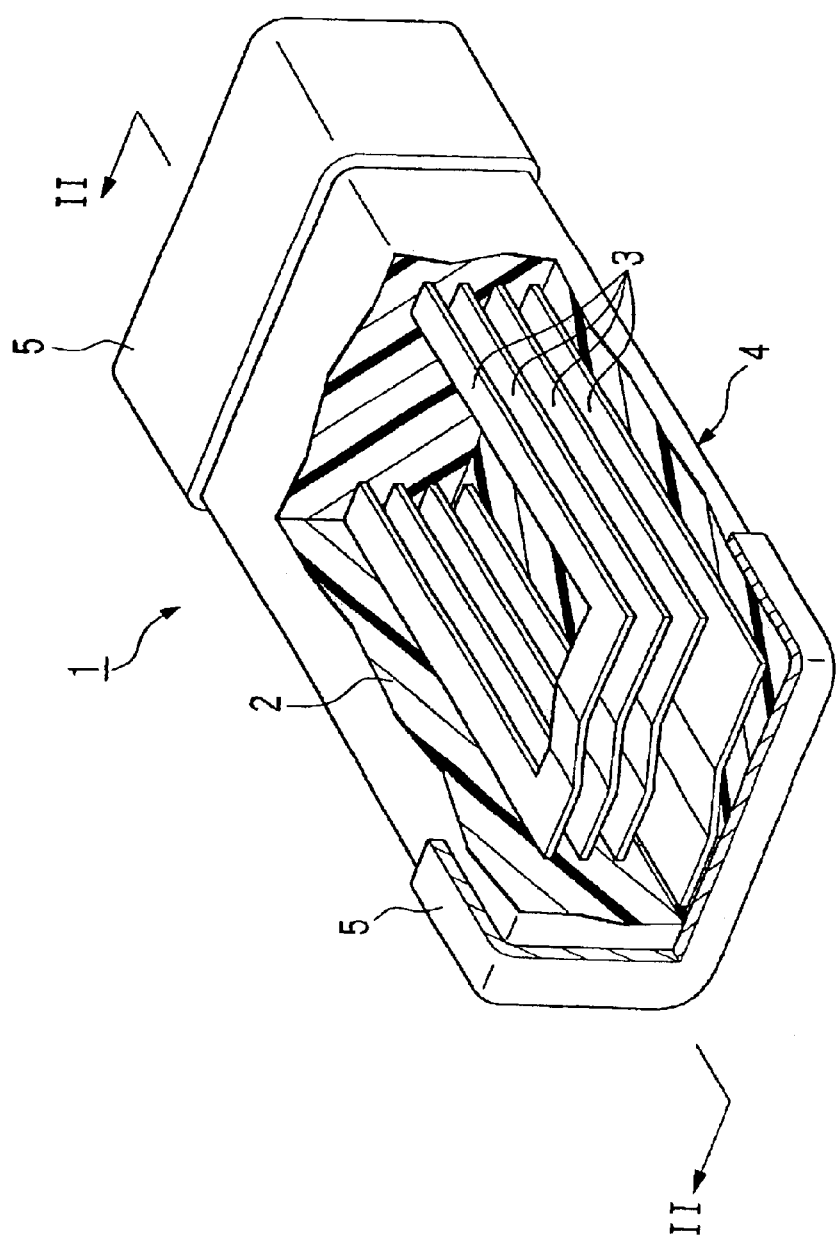
FIG. 29 is a schematic sectional view showing an example of a multilayer ferrite chip bead.
Figure 30:
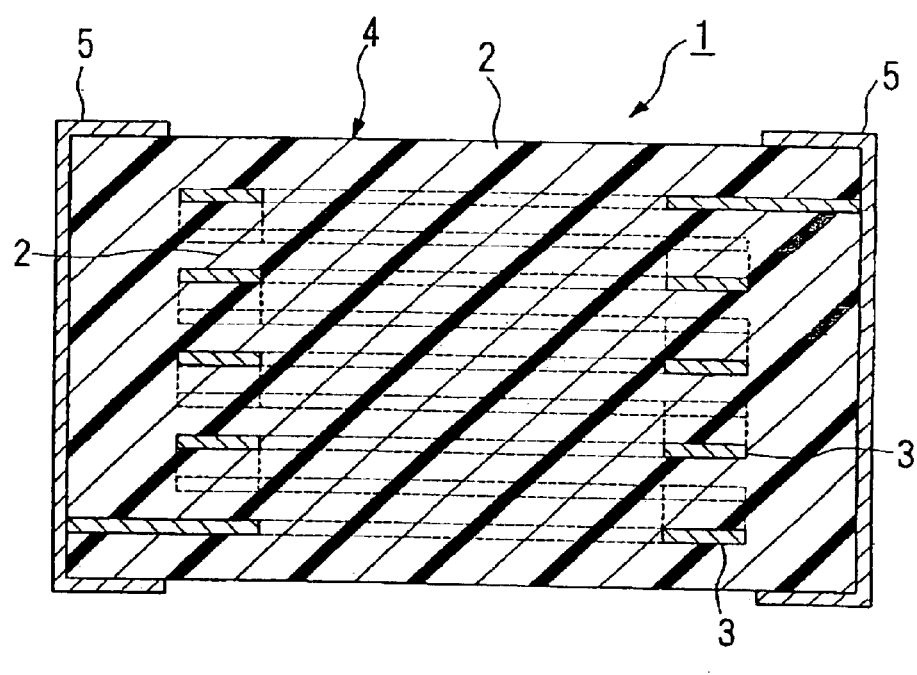
FIG. 30 is a schematic cross section of the multilayer ferrite chip bead shown in FIG. 29.

FIG. 29 is a schematic sectional view showing an example of a multilayer ferrite chip bead that is an embodiment of the multilayer ferrite chip components of the present invention, and FIG. 30 is a schematic cross section thereof. This multilayer ferrite chip bead is manufactured by using a print stacking method. Another manufacturing method is a sheet stacking method. In FIG. 29 and FIG. 30, a multilayer ferrite chip bead 1 comprises a chip body 4 having a multi layer structure in which magnetic ferrite layers 2 and internal electrodes 3 are alternately stacked and united. External electrodes 5 and 5, which have electric conduction with the internal electrodes 3, are provided at the end portions of the chip body 4.

The magnetic ferrite layers 2 constituting the multilayer ferrite chip bead 1 are constituted of the sintered body of hexagonal ferrite of the present invention. Specifically, the magnetic ferrite layers 2 can be formed by alternately screen printing and stacking paste for the magnetic ferrite layers 2, and paste for the internal electrodes 3, and followed by sintering. Herein, the paste for the magnetic ferrite layers 2 is obtained by mixing the magnetic ferrite powder of the present invention with binder such as ethyl cellulose and solvent such as terpineol and butyl carbitol.

Content of the binder and the solvent in the paste for the magnetic ferrite layers are not limited. For example, the content of the binder can be set in a range from 1 wt % to 10 wt %, and the content of the solvent can be set in a range from about 10 wt % to 50 wt %. In addition, dispersant, plasticizer, dielectric, insulator and the like can be contained in the paste in a range below 10 wt % if necessary.

Alternatively, the magnetic ferrite layers 2 can be formed by using the sheet for the magnetic ferrite layers. Specifically, the magnetic ferrite powder of the present invention is mixed with binder having polyvinyl butyral or acryl as a main component and solvent such as toluene, xylene and ethyl alcohol, in a ball mill to obtain slurry. The slurry is then applied onto a polyester film and the like by a doctor blade method and the like, is then dried, to obtain the sheet for the magnetic ferrite layers. The sheet for the magnetic ferrite layers is alternately stacked with the paste for the internal electrodes, and then sintered. Note that the content of the binder in the sheet for the magnetic ferrite layers is not limited. For example, it can be set in a range from about 1 wt % to 20 wt %. In addition, dispersant, plasticizer, dielectric, insulator and the like can be contained in the sheet for the magnetic ferrite layers in a range below 10 wt % if necessary.

The internal electrodes 3 constituting the multilayer ferrite chip bead 1 are formed by using conductive material having Ag with a small resistivity as a main element in order to obtain a practical quality factor Q as an inductor. Since each layer of the internal electrodes 3 is an oval shape and conduction is secured in a spiral state for each layer of the adjacent internal electrodes 3, the internal electrodes 3 constitute a closed magnetic circuit coil (a winding pattern). The external electrodes 5 and 5 are connected at the both ends.

An external shape and the dimensions of the chip body 4 of the multilayer ferrite chip bead 1 are not particularly limited, and can appropriately be set in accordance with application. Normally, the external shape can be approximately a rectangular solid shape, and the dimensions can be made to be approximately 1.0 mm to 4.5 mm by 0.5 mm to 3.2 mm by 0.6 mm to 1.9 mm. In addition, the thickness between the electrodes and a base thickness of the magnetic ferrite layers 2 are not particularly limited. The thickness between the electrodes (the gap between the internal electrodes 3 and 3) can be set from 10 $\mu$m to 100 $\mu$m, and the base thickness can be set approximately from 250 $\mu$m to 500 $\mu$m. Moreover, the thickness of the internal electrodes 3 can be normally set in a range from 5 $\mu$m to 30 $\mu$m, a pitch of the winding pattern can be set approximately from 10 $\mu$m to 100 $\mu$m, and the number of turns can be set approximately from 1.5 turns to 20.5 turns.

The sintering temperature after the paste or sheet for the magnetic ferrite layers and the paste for the internal electrodes are alternately screen printed and stacked shall be from 800° C. to 960° C., preferably from 850° C. to 930° C. Sintering is insufficient if the sintering temperature is under 800° C. On the other hand, if the sintering temperature exceeds 960° C., Ag being the internal electrode material disperses into the magnetic ferrite layers 2, which may reduce electromagnetic properties considerably. The duration of sintering can be set from 0.05 hour to 5 hours, preferably in a range from 0.1 hour to 3 hours. Since sintering is performed at such a low temperature in the present invention, a grain size of the magnetic ferrite layers 2 is as fine as 1 $\mu$m to 5 $\mu$m on average.

Figure 31:
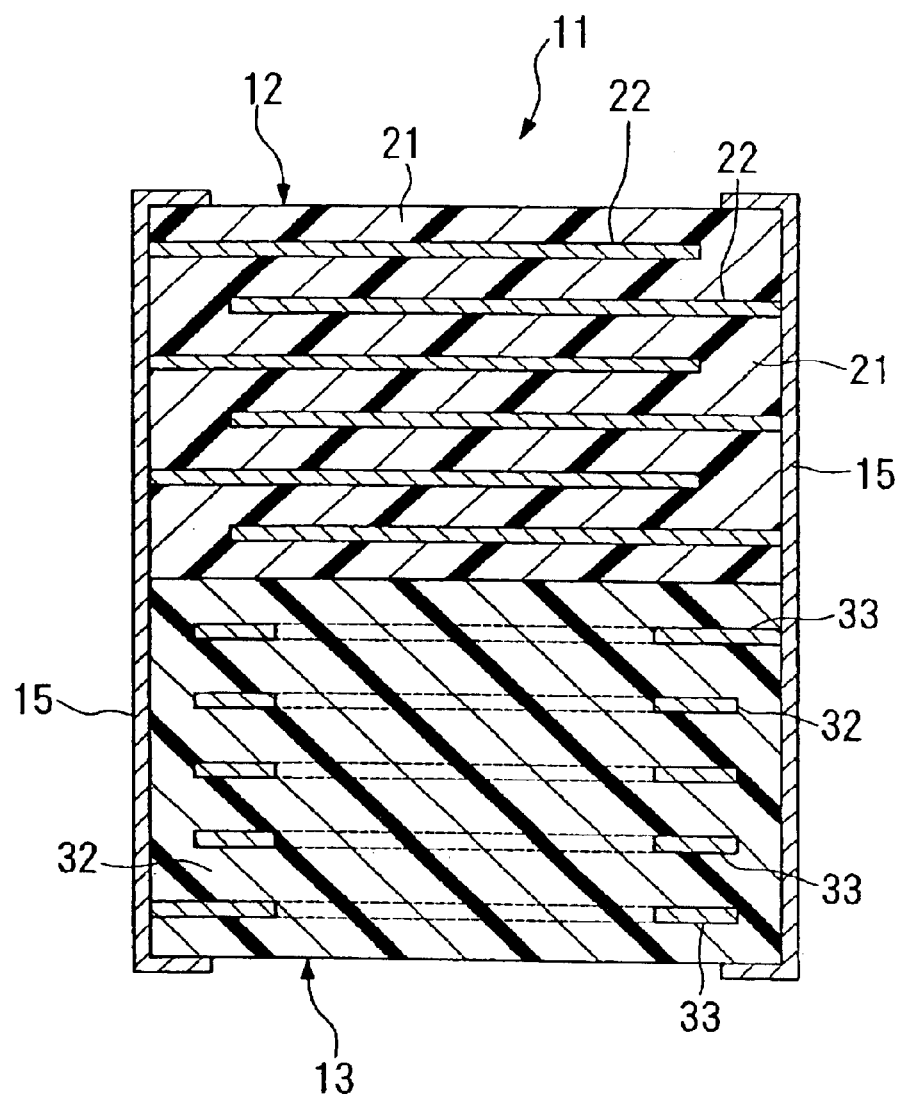
FIG. 31 is a schematic sectional view of an example of an LC integrated multilayer component.

FIG. 31 is a schematic sectional view of an example of an LC integrated component that is an embodiment of the LC integrated multilayer component of the present invention. In FIG. 31, an LC integrated component 11 is the one in which a chip condenser portion 12 and a chip ferrite portion 13 are united, and external electrodes 15 are provided at the end portions. The chip condenser portion 12 includes a multi layer structure where dielectric layers 21 and internal electrodes 22 are alternately stacked to make them into a monolithic laminated structure.

The ceramic dielectric layers 21 are not particularly limited, and various dielectric materials can be used. A titanium based dielectric whose sintering temperature can be low is preferable. Alternatively, a titanate based complex oxide, zirconate based complex oxide or mixture of these can be used. Moreover, various glasses such as borosilicate glass may be contained to lower the sintering temperature.

In addition, the internal electrodes 22 are formed by using conductive material having Ag with a small resistivity as a main element, and each layer of the internal electrodes 22 is alternately connected to different external electrodes.

The chip ferrite portion 13 is a multilayer ferrite chip inductor, which is a chip body with a multi layer structure where ferrite magnetic layers 32 and internal electrodes 33 are alternately stacked to made them into a monolithic laminated structure. The ferrite magnetic layers 32 are constituted of the magnetic ferrite of the present invention. Specifically, the ferrite magnetic layers 32 can be formed by alternately screen printing and stacking paste for the ferrite magnetic layers 32 and paste for internal electrodes 33, followed by sintering. Herein, the paste for the ferrite magnetic layer 32 is obtained by mixing the magnetic ferrite powder of the present invention with binder such as ethyl cellulose and solvent such as terpineol and butyl carbitol. Alternatively, the magnetic ferrite powder of the present invention is mixed with binder having polyvinyl butyral or acryl as a main component and solvent such as toluene, xylene and ethyl alcohol, in a ball mill to obtain slurry. The slurry is then applied onto a polyester film and the like by a doctor blade method and the like, is then dried, to obtain the sheet for the magnetic ferrite layers. The sheet for the magnetic ferrite layers is alternately stacked with the paste for the internal electrodes, and then sintered to form the ferrite magnetic layers 32.

Conduction is secured in a spiral state for internal electrodes 33, which constitute the closed magnetic circuit coil (a winding pattern), and its both ends are connected to the external electrodes 15. The internal electrodes 33 are formed by using the conductive material having Ag with a small resistivity as a main element.

The thickness between the electrodes and a base thickness of the ferrite magnetic layers 32 of the chip ferrite portion 13 are not particularly limited. The thickness between the electrodes (the gap between the internal electrodes 33 and 33) can be set from 10 $\mu$m to 100 $\mu$m, and the base thickness can be set approximately from 10 $\mu$m to 500 $\mu$m. Moreover, the thickness of the internal electrodes 33 can be normally set in a range from 5 $\mu$m to 30 $\mu$m, a pitch of the winding pattern can be set approximately from 10 $\mu$m to 400 $\mu$m, and the number of turns can be set approximately from 1.5 turns to 50.5 turns.

An external shape and the dimensions of the LC integrated component 11 of the present invention are not particularly limited, but appropriately can be set in accordance with application. Normally, the external shape can be approximately a rectangular solid shape, and the dimensions can be made to be approximately 1.6 mm to 10.0 mm by 0.8 mm to 15.0 mm by 1.0 mm to 5.0 mm.

Next, the present invention will be described in detail by citing specific examples.

Example 1

Calcining and milling were performed after raw material powder is compounded so as to have the composition shown in FIG. 32 and FIG. 33. Note that the ferrite shown in FIG. 32 is the hexagonal ferrite, and the ferrite shown in FIG. 33 is the NiCuZn ferrite. The conditions for the compounding, the calcining and the milling are shown as follows. FIG. 34 shows the specific surface area of each raw material powder, which is 4.5 m$^2$/g or more.

Pot for compounding and milling: a stainless steel ball mill pot was used (a polypot was used in milling the samples No. 2 to No. 4)

Medium for compounding and milling: a steel bowl was used (a ZrO$_2$ bowl was used in milling the sample No. 2)

Compounding time: 16 hours
Calcining conditions:
   the samples No. 1, No. 3 and No. 4=1300° C.×2 hours
   the sample No. 2=1200° C., 1250° C., 1300° C., 1350° C.×2 hours
   the sample No. 5=750° C.×10 hours
Milling time: 90 hours Identification of phases was performed by the X-ray diffraction regarding the milled powder of the sample No. 2, and the X-ray peak intensity ratio of the identified phases was obtained. FIG. 1 shows the results. Note that the X-ray peak intensity ratio is defined as a ratio of the maximum peak intensity of each phase to sum of the maximum peak intensity of a diffraction line with regard to the identified phase. The conditions for the X-ray diffraction are shown as follows. X-ray generator: 3 kW Tube voltage: 45 kV Tube current: 40 mA Sampling width: 0.02 deg Scanning speed: 4.00 deg/min Diverging slit: 1.00 deg Scattering slit: 1.00 deg Receiving slit: 0.30 mm As shown in FIG. 1, M phase, Y phase, Z phase, $Ba_2Fe_2O_5$ phase (Ba ferrite phase) and a $BaCO_3$ phase were identified when the calcining temperature was at 1200° C. In this calcining temperature, the M phase has the highest peak intensity ratio. The M phase, the Y phase, the Z phase, the Ba ferrite phase and the $BaCO_3$ phase were also identified when the calcining temperature was at 1250° C. The Z phase has the highest peak intensity ratio of 35%, and it is understood that the Z phase forms the main phase. When the behavior of each phase when the calcining temperature is between 1200° C. and 1250° C., the calcining needs to be performed at the temperature of 1220° C. or higher to make the Z phase be the main phase, that is, to make the peak intensity ratio of the Z phase be higher than the peak intensity ratio of other phases. Further, the calcining needs to be performed at the temperature of 1240° C. or higher to make the peak intensity ratio of the Z phase be 30% or higher. When the calcining temperature reached 1300° C., identified phases became three phases such as the Z phase, the Ba ferrite phase and the $BaCO_3$ phase, and the peak intensity ratio of the Z phase reached as high as 60%. When the calcining temperature exceeded 1330° C., the peak intensity ratio of the Z phase was lowered and the peak intensity ratio of the Ba ferrite phase became the highest. As described above, to make the Z phase be the main phase, the calcining temperature should be desirably at 1220° C. or higher and more desirably at 1250° C. or higher, and at 1330° C. or lower and desirably at 1320° C. or lower.

Figure 2:
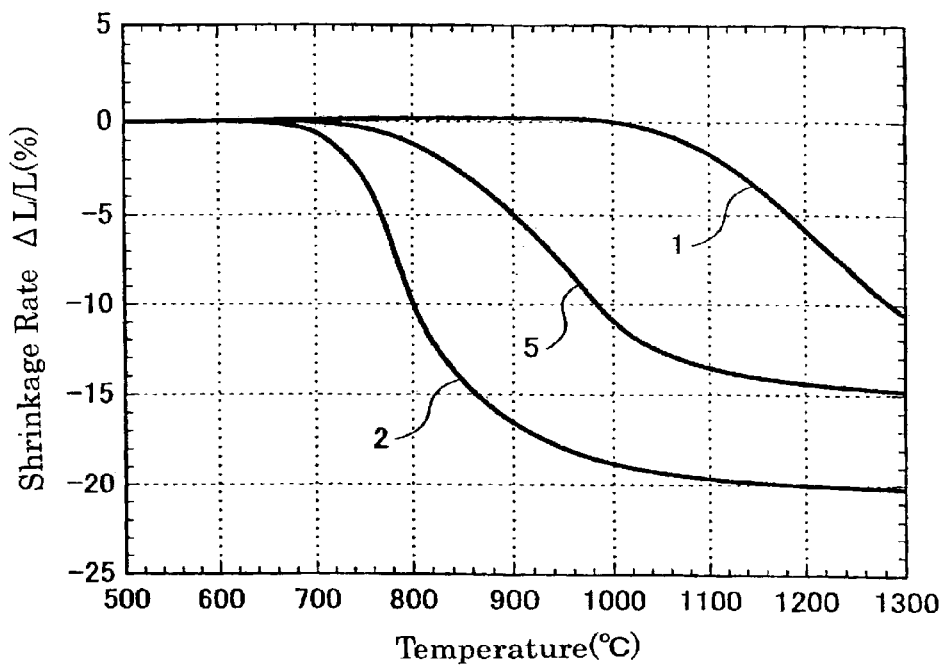
FIG. 2 is a graph showing the temperature shrinkage curves of samples No. 1, No. 2 and No. 5.

The shrinkage rate (ΔL/L) was measured when the milled powder of the samples No. 1, No. 2 and No. 5 after the calcining is heated to the predetermined temperature. The shrinkage rate is a guidepost for easiness of sintering, and it is considered that, at the same temperature, the larger the shrinkage rate is, the easier the sintering can be performed. FIG. 2 shows the results. The diagrams in FIG. 2 are referred to as temperature shrinkage curves. As shown in FIG. 2, the sample No. 2 has a higher shrinkage rate than that of the sample No. 5, that is, the NiCuZn ferrite that has conventionally been considered to be capable of sintering at a low temperature, at the same temperatures. Therefore, it is understood that the powder of the sample No. 2 can be co-sintered with Ag. The difference between the samples No. 2 and No. 1 is that the former is added with CuO and $Bi_2O_3$. Accordingly, it is understood that CuO and $Bi_2O_3$ are effective for improving the shrinkage rate, that is, for enabling the low temperature sintering.

Figure 3:
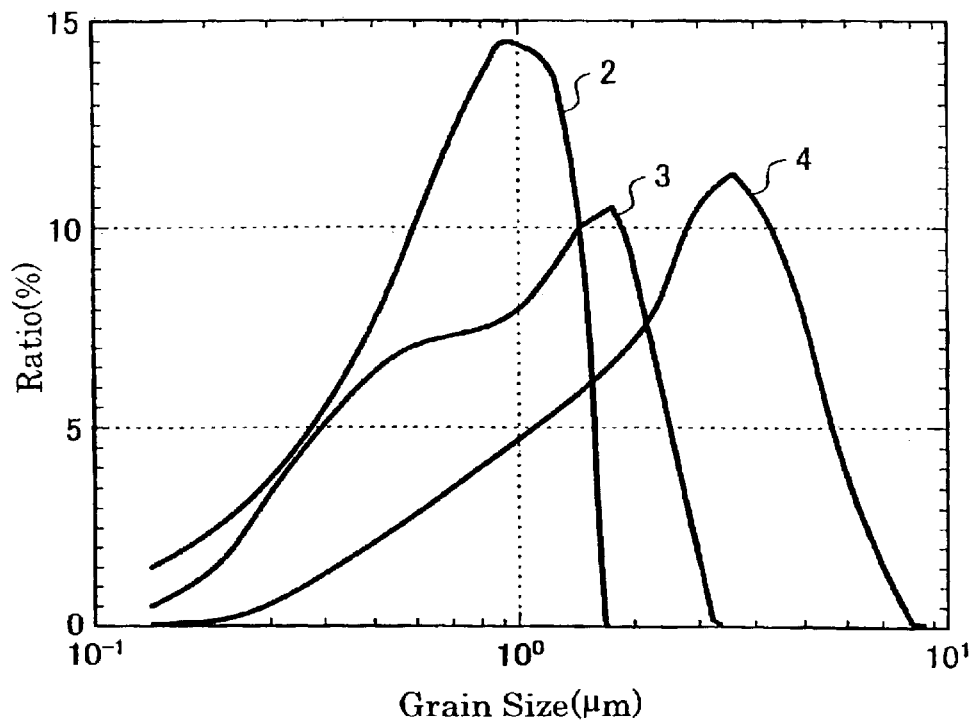
FIG. 3 is a graph showing the grain size distribution of samples No. 2, No. 3 and No. 4.
Figure 4:
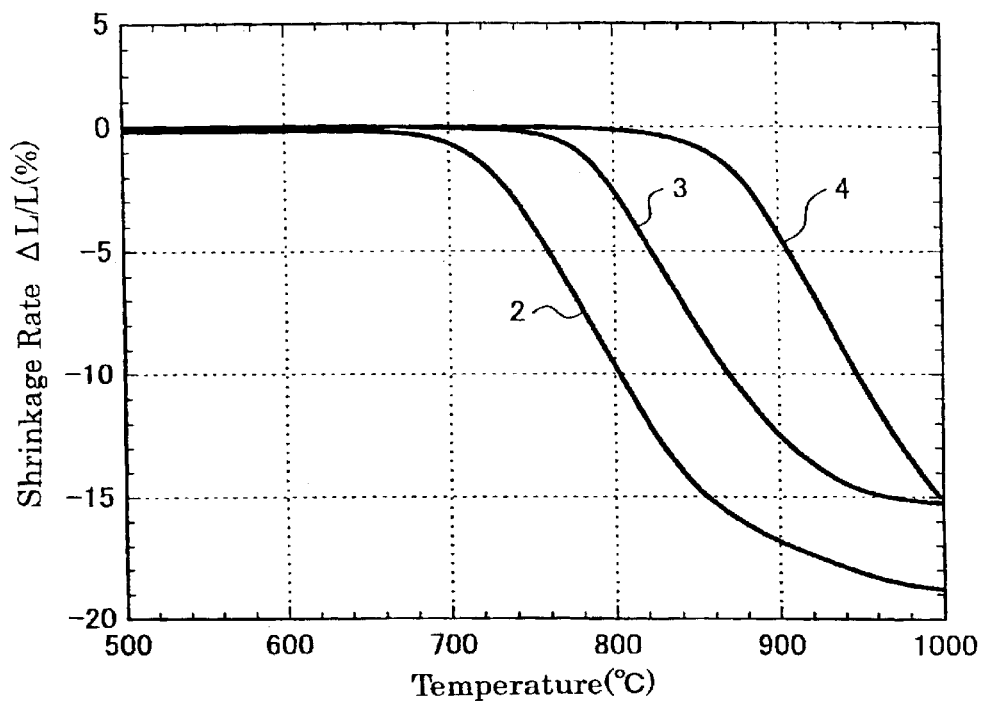
FIG. 4 is a graph showing the temperature shrinkage curves of samples No. 2, No. 3 and No. 4.

FIG. 3 shows the grain size distribution of the samples No. 2 to No. 4. Note that the samples No. 2, No. 3 and No. 4 have the same composition as shown in FIG. 32. The peak value of the grain size distribution is: 1.0 μm for the sample No. 2; 1.65 μm for the sample No. 3; and 3.3 μm for the sample No. 4. The shrinkage rate (ΔL/L) was measured for the samples No. 3 and No. 4 when heated to the predetermined temperature in the same manner as described above. The results are shown in FIG. 4 along with the result of the sample No. 2. From the results, it is understood that the shrinkage rate at the same temperature becomes higher in the order of the samples No. 2, No. 3 and No. 4. In other words, FIG. 3 and FIG. 4 make it clear that the smaller the peak value of the grain size distribution of the milled powder, the more desirable for the low temperature sintering. However, if the peak value of the grain size distribution of the milled powder is too small, the specific surface area of the powder becomes large, making it difficult to obtain the paste and the sheet for obtaining the multilayer ferrite chip components. Therefore, the present invention proposes that the peak value of the grain size distribution be in a range from 0.1 μm to 3 μm.

Figure 5:
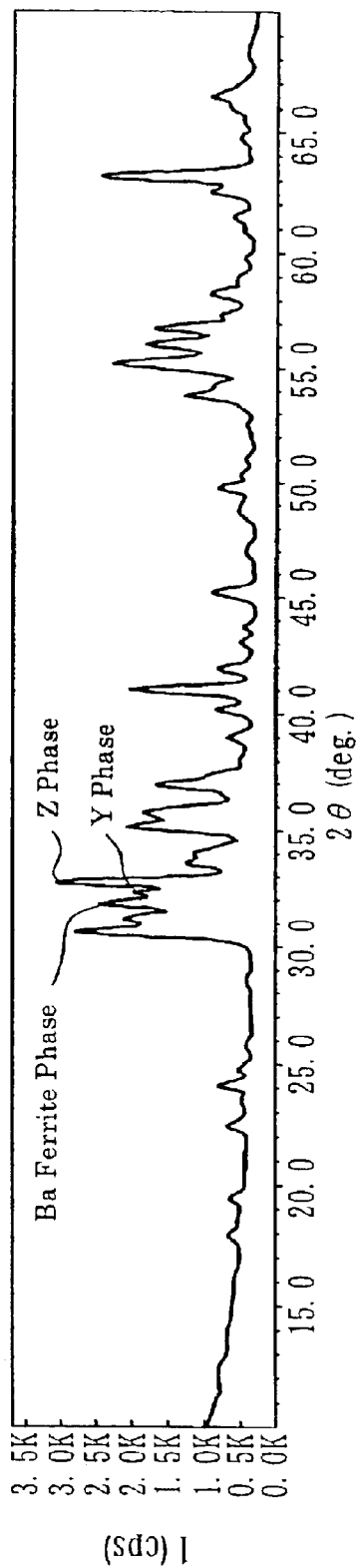
FIG. 5 is a graph showing the X-ray diffraction pattern of the sample No. 2.

The X-ray diffraction pattern was measured for the powder of the sample No. 2 after sintering at 910° C. for 2 hours. FIG. 5 shows the result. As shown in FIG. 5, the Z phase, the Y phase and the Ba ferrite phase were identified. As shown in FIG. 5, the Z phase shows the highest peak intensity, and it is understood that the Z phase forms the main phase. In addition, the peak intensity ratio of the Z phase was calculated from the highest peak intensity of each phase, which was 41.93%.

Figure 6:
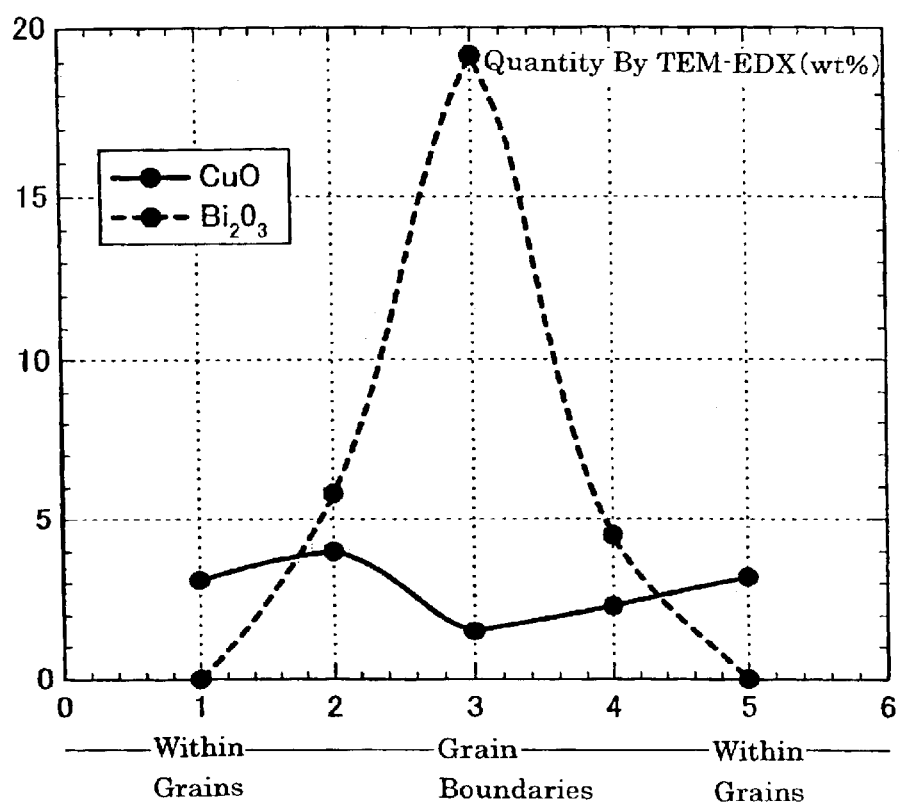
FIG. 6 is a graph showing the TEM-EDX analysis results in the vicinity of grain boundaries of a sintered body by the sample No. 2.

The vicinity of the grain boundaries was analyzed by a TEM-EDX to confirm the positions of CuO and $Bi_2O_3$ within the sintered body. FIG. 6 shows the results, and $Bi_2O_3$ exists at the grain boundaries and a liquid-phase sintering is performed by adding $Bi_2O_3$. On the other hand, the concentration of CuO is higher within the grain rather than at the boundaries. It is then presumed that CuO is taken into $Co_3O_4$ site. CuO is a low-melting point oxide, which contributes to the low temperature sintering. In other words, although both CuO and $Bi_2O_3$ contribute to the low temperature sintering, it is desirable to add CuO and $Bi_2O_3$ in combination because each one has the different mechanism for contributing to the low temperature sintering.

Further, the mean grain size of the sintered body was measured, which was in a range from 1 μm to 5 μm. Since the sintered body of the present invention is sintered at a temperature as low as 910° C., the grain size is fine.

Figure 7:
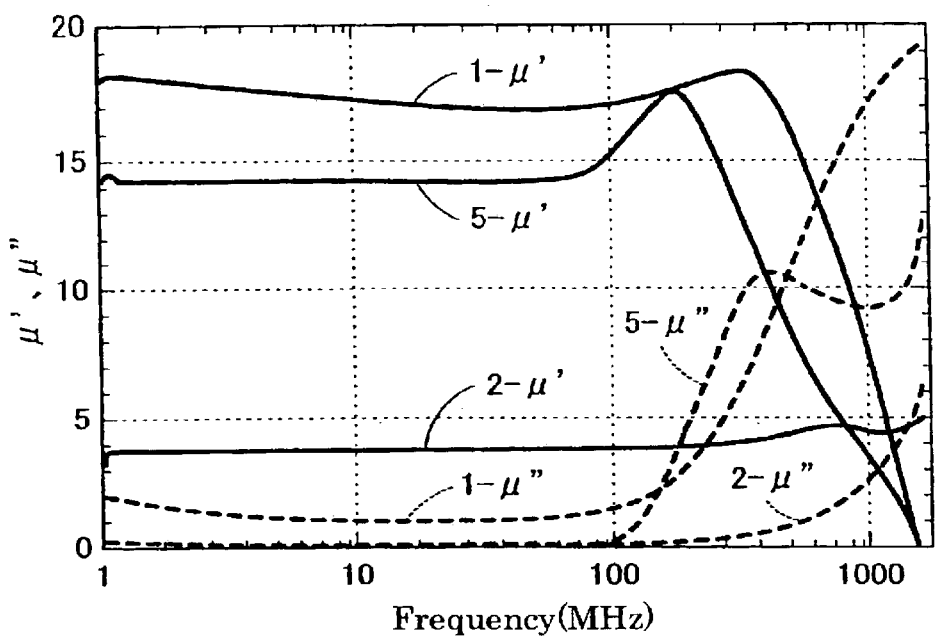
FIG. 7 is a graph showing the frequency characteristics of μ' and μ" of samples No. 1, No. 2 and No. 5.

Toroidal cores created by using the milled powder of the samples No. 1, No. 2 and No. 5 were inserted to a coaxial tube sample holder, and the complex permeability ($\mu'$, $\mu''$) in the high frequency range (1 MHz to 1.8 GHz) was measured by using an impedance analyzer (manufactured by Hewlett-Packard Ltd.). Note that the toroidal cores were formed by sintering at 930° C. for 2 hours. FIG. 7 shows the results. In FIG. 7, the indication of 1-$\mu'$ denotes a real part of the complex permeability of the sample No. 1, and the indication of 1-$\mu''$ denotes an imaginary part of the complex permeability of the sample No. 1. The same applies to the other values. In the toroidal core by the sample No. 2, the flat portion of $\mu'$ extends to a higher frequency range than in the toroidal core by the samples No. 1 and No. 5, implying that the sample No. 2 can be used in the higher frequency range.

2.5 wt % of ethyl cellulose and 40 wt % of terpineol were added to 100 wt % of the powder of the samples No. 2 and No. 5, and mixed by three rolls to prepare the paste for the magnetic ferrite layers. At the same time, 25 wt % of ethyl cellulose and 40 wt % of terpineol were added to 100 wt % of Ag having the mean grain size of 0.8 μm, and mixed by three rolls to prepare the paste for the internal electrodes.

After the paste for the magnetic ferrite layers and the paste for the internal electrodes of these kinds were alternately screen printed and stacked, sintering was performed at 910° C. for 2 hours. As a result, the multilayer ferrite chip bead 1 of 1608 type as shown in FIG. 29 and FIG. 30 was obtained. The dimension of the multilayer ferrite chip bead 1 is 1.6 mm×0.8 mm×0.8 mm, and the number of turns was set to 2.5 turns. Next, the external electrodes 5 were formed by baking approximately at 600° C. at the end portions of the multilayer ferrite chip bead 1.

Figure 8:
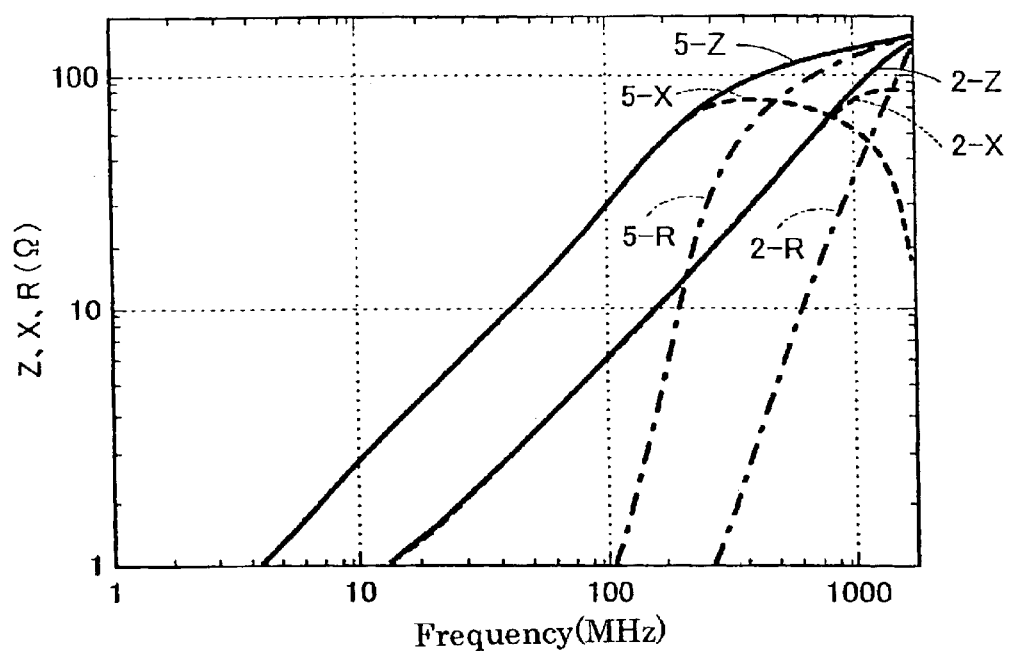
FIG. 8 is a graph showing the frequency characteristics of impedance of a chip by the samples No. 2 and No. 5.

Impedance Z was measured with regard to these two multilayer ferrite chip beads 1 by using a network impedance analyzer (manufactured by Hewlett-Packard Ltd.) in the measurement frequency of 1 MHz to 1.8 GHz. FIG. 8 shows the results. It is understood from FIG. 8 that, when comparing with the comparative sample No. 5, the impedance Z value of the sample No. 2 of the present invention shifted to the higher frequency side, and the noise absorption in the high frequency is enabled.

EXAMPLE 2

Milled powders having various specific surface areas as shown in FIG. 35 were obtained by changing the milling time after the calcining of the sample No. 2 used in Example 1. Toroidal cores were created by using the milled powders in the same manner as Example 1. The permeability $\mu$ (100 MHz), sintered body density and the shrinkage rate upon sintering of the cores were measured. FIG. 35 shows the results in combination. The sintered body density is as low as 4.5 g/cm$^3$ when the specific surface area is 1 m$^2$/g. In accordance with this, the permeability $\mu$ is insufficient as it is 2.5. The sintered body density increases as the specific surface area becomes larger. The sintered body density of 5 g/cm$^3$ or higher can be obtained when the specific surface area is 10 m$^2$/g or more, and thus a high value of the permeability $\mu$ also can be obtained.

Evaluation was performed for transformation of each milled powder shown in FIG. 35 into paint. This is because the milled powder is provided to the paste paint and sheet paint in the course of manufacturing the multilayer ferrite chip components. As a result, the paint turned into gel when the specific surface area became 35 m$^2$/g, where it was confirmed that coating became difficult.

According to the above results, the specific surface area of the powder is desirably made to be 5 m$^2$/g to 30 m$^2$/g, and more desirably 10 m$^2$/g to 25 m$^2$/g, in order to manufacture the multilayer ferrite chip components.

EXAMPLE 3

Cores with a toroidal shape were created by using the milled powder having the composition shown in FIG. 36 in the same manner as the sample No. 2 of Example 1. In FIG. 36, the samples No. 6 to No. 9 are the examples where a portion of Co$_3$O$_4$ was substituted with NiO, the samples No. 10 to No. 13 are the examples where a portion of Co$_3$O$_4$ was substituted with MnO, the samples No. 14 to No. 17 are the examples where a portion of Co$_3$O$_4$ was substituted with ZnO, and the samples No. 18 to No. 21 are the examples where a portion of Co$_3$O$_4$ was substituted with MgO. The peak value of the mean grain size distribution of each sample is 1.0 $\mu$m, and the specific surface area is 11 m$^2$/g. The permeability was measured for the obtained cores in the same manner as Example 1. Note that the measurement was performed in the frequency range as high as 6 GHz in Example 3. FIG. 9 to FIG. 12 show the results together with the measurement result of the sample No. 2.

Figure 9:
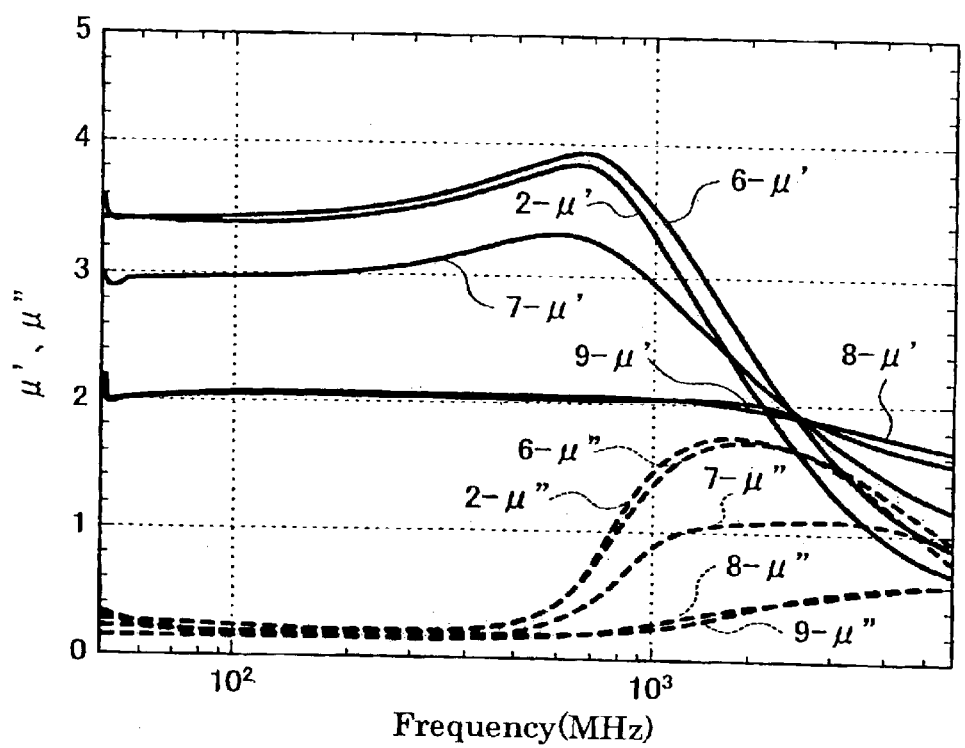
FIG. 9 is a graph showing the frequency characteristics of μ' and μ" of the NiO substitutional material.

In FIG. 9, the peak value of $\mu''$ was obtained at the frequency of about 1.5 GHz regarding the sample No. 2 that does not contain NiO. On the other hand, the peak value of $\mu''$ was obtained at the frequency of about 2.5 GHz regarding the sample No. 6 where a portion of Co$_3$O$_4$ was substituted with NiO. Thus, it is understood that the peak value of $\mu''$ shifted to the higher frequency side. The peak value of $\mu''$ was obtained at the frequency of about 3 GHz regarding the sample No. 7, and it can be presumed that the peak values of $\mu''$ regarding the samples No. 8 and No. 9 are obtained at the frequency of 6 GHz or higher. From the above results, it is understood that the peak value of $\mu''$ shifts to the higher frequency side when a portion of Co$_3$O$_4$ is substituted with NiO and the amount of substitution increases. This implies that the material having the peak value of $\mu''$ in accordance with the frequency range, the noise of which needs to be absorbed, can be obtained by a simple method of setting the amount of NiO for substitution.

Figure 10:
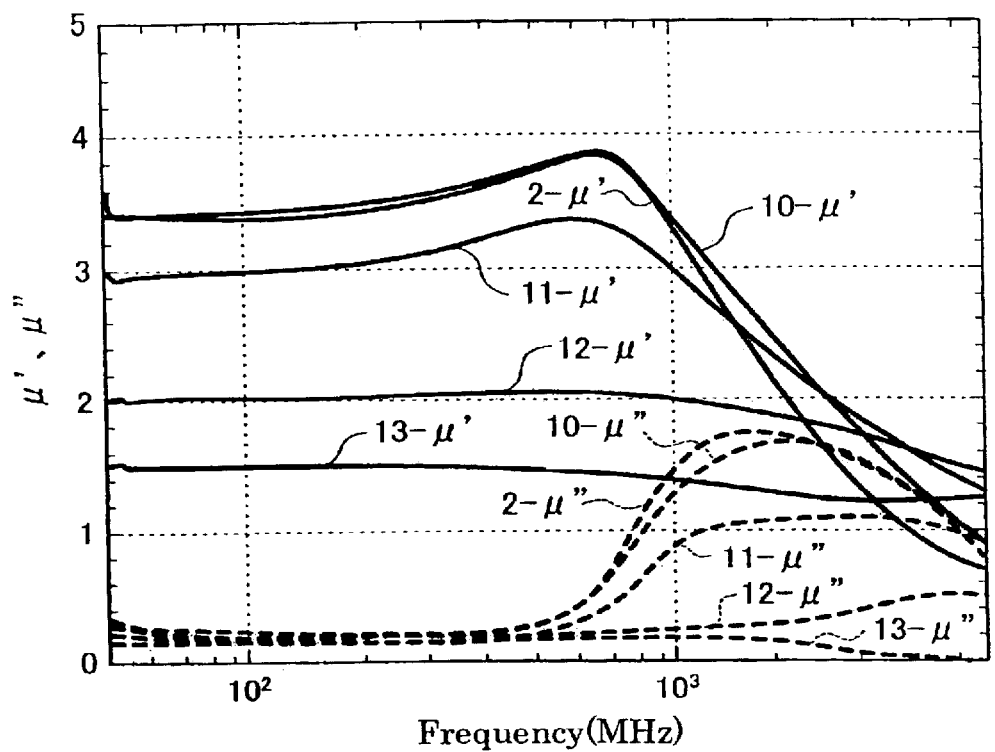
FIG. 10 is a graph showing the frequency characteristics of μ' and μ" of the MnO substitutional material.
Figure 11:
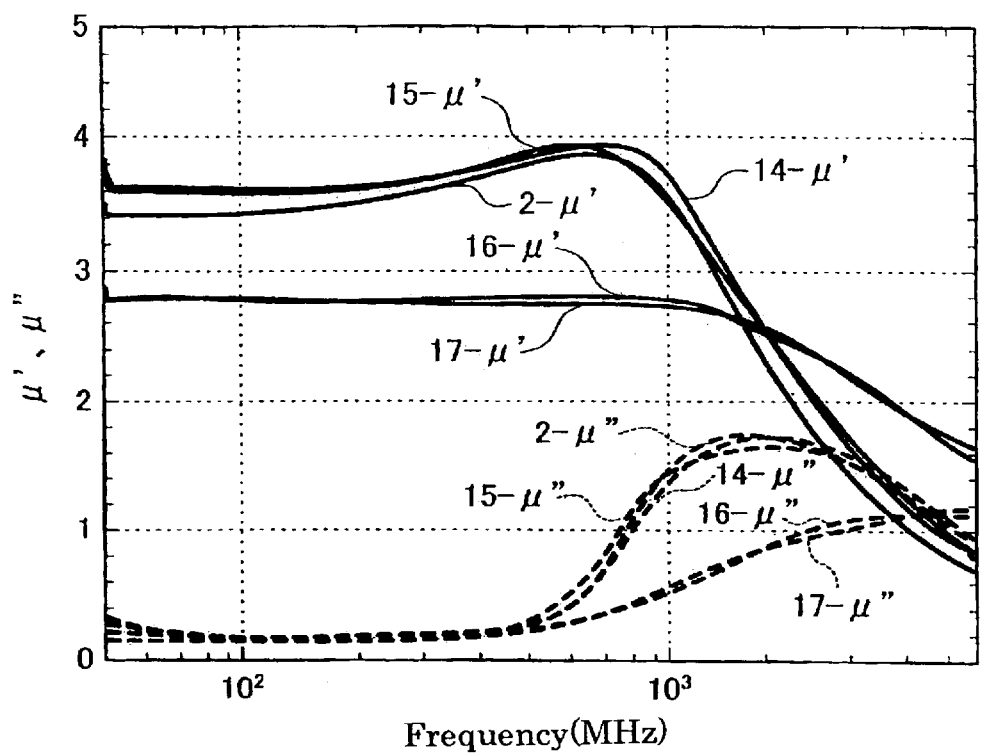
FIG. 11 is a graph showing the frequency characteristics of μ' and μ" of the ZnO substitutional material.
Figure 12:
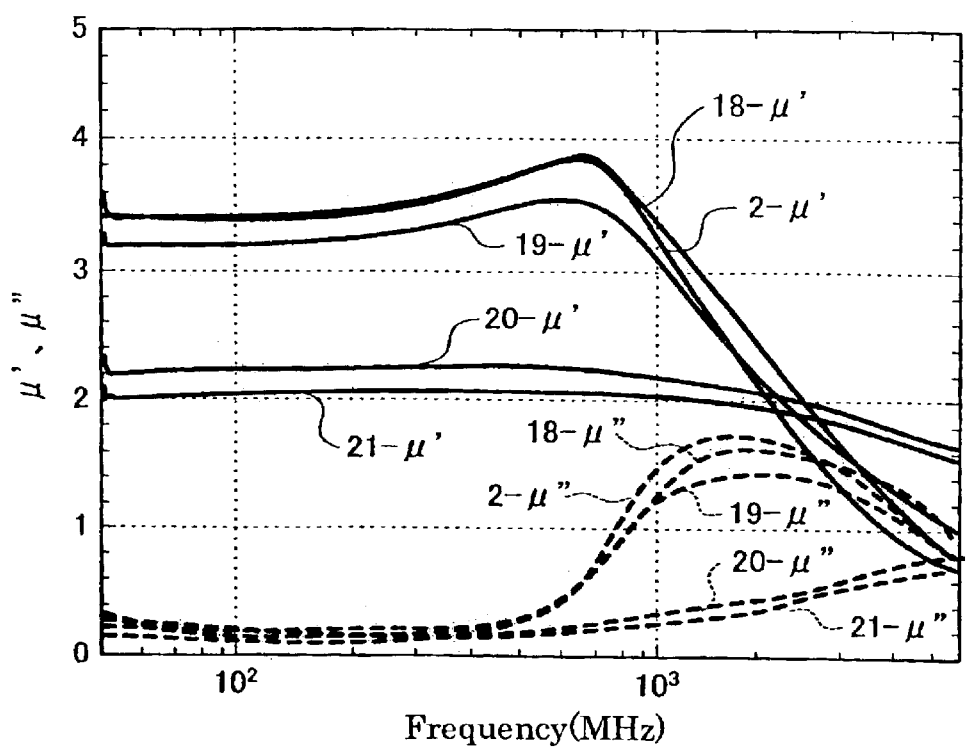
FIG. 12 is a graph showing the frequency characteristics of μ' and μ" of the MgO substitutional material.

The similar tendencies are shown in FIG. 10 to FIG. 12. Therefore, the peak value of $\mu''$ can be positioned in a desired frequency range by appropriately setting the amount of substitution not only with NiO but also with MnO, ZnO and MgO.

Figure 13:
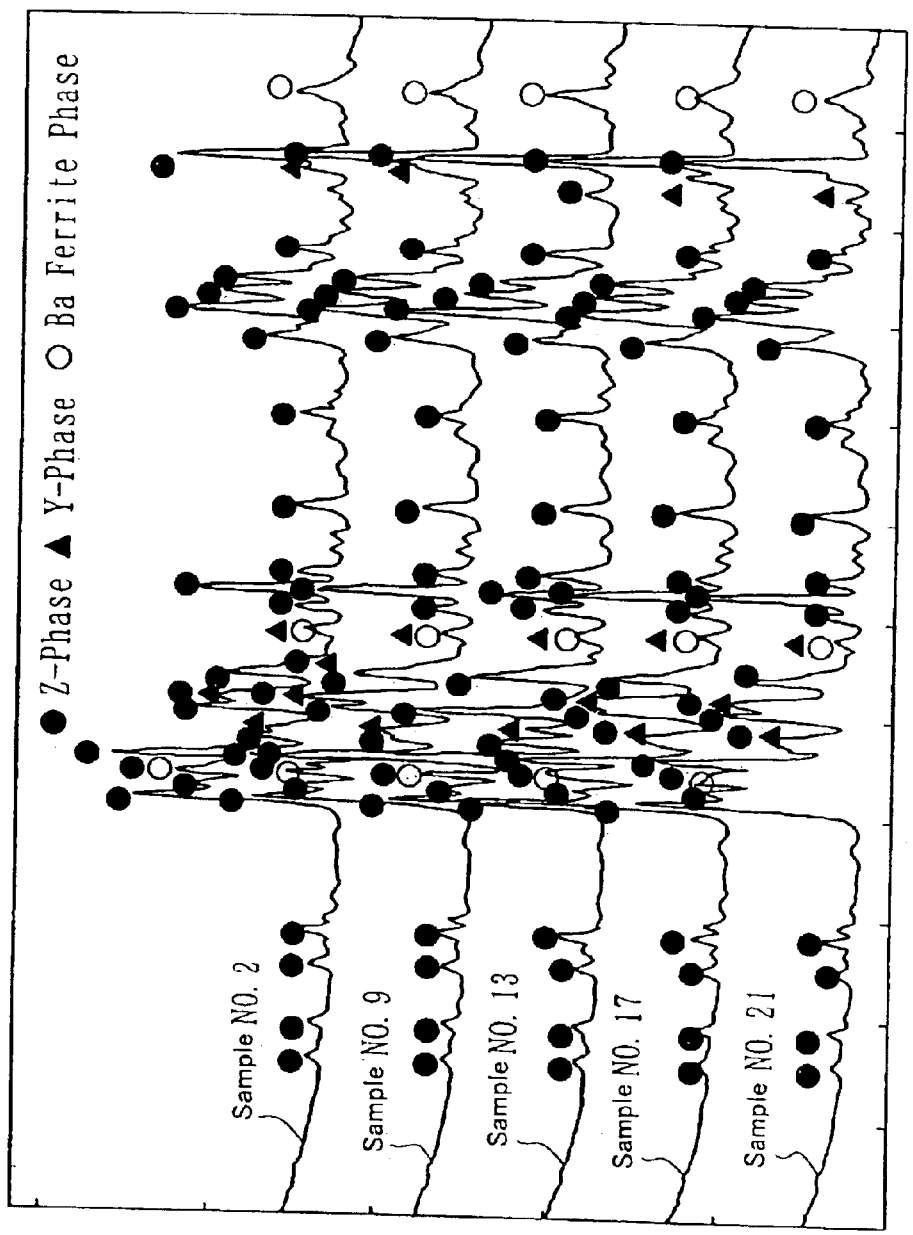
FIG. 13 is a graph showing the X-ray diffraction pattern according to Example 3.

The X-ray diffraction was performed for the sintered bodies of the sample No. 9 (substitution with NiO), No. 13 (substitution with MnO), No. 17 (substitution with ZnO) and No. 21 (substitution with MgO). FIG. 13 shows the results. Although FIG. 13 shows the X-ray diffraction data of the sample No. 2 in combination, it was confirmed that the phase constitution similar to the sample No. 2 was obtained even if substitution is made with NiO or the like.

EXAMPLE 4

Calcining and milling were performed after raw material powder is compounded so as to have the composition shown in FIG. 37. In FIG. 37, the samples No. 22 to No. 25 are the examples where a portion of Co$_3$O$_4$ of the sample No. 2 was substituted with CuO. The conditions for the compounding, the calcining and the milling are shown as follows. FIG. 34 shows the specific surface area of each raw material powder, which is 4.5 m$^2$/g or more.

Pot for compounding and milling: a stainless steel ball mill pot was used

Medium for compounding and milling: a steel bowl was used

Compounding time: 16 hours

Figure 14:
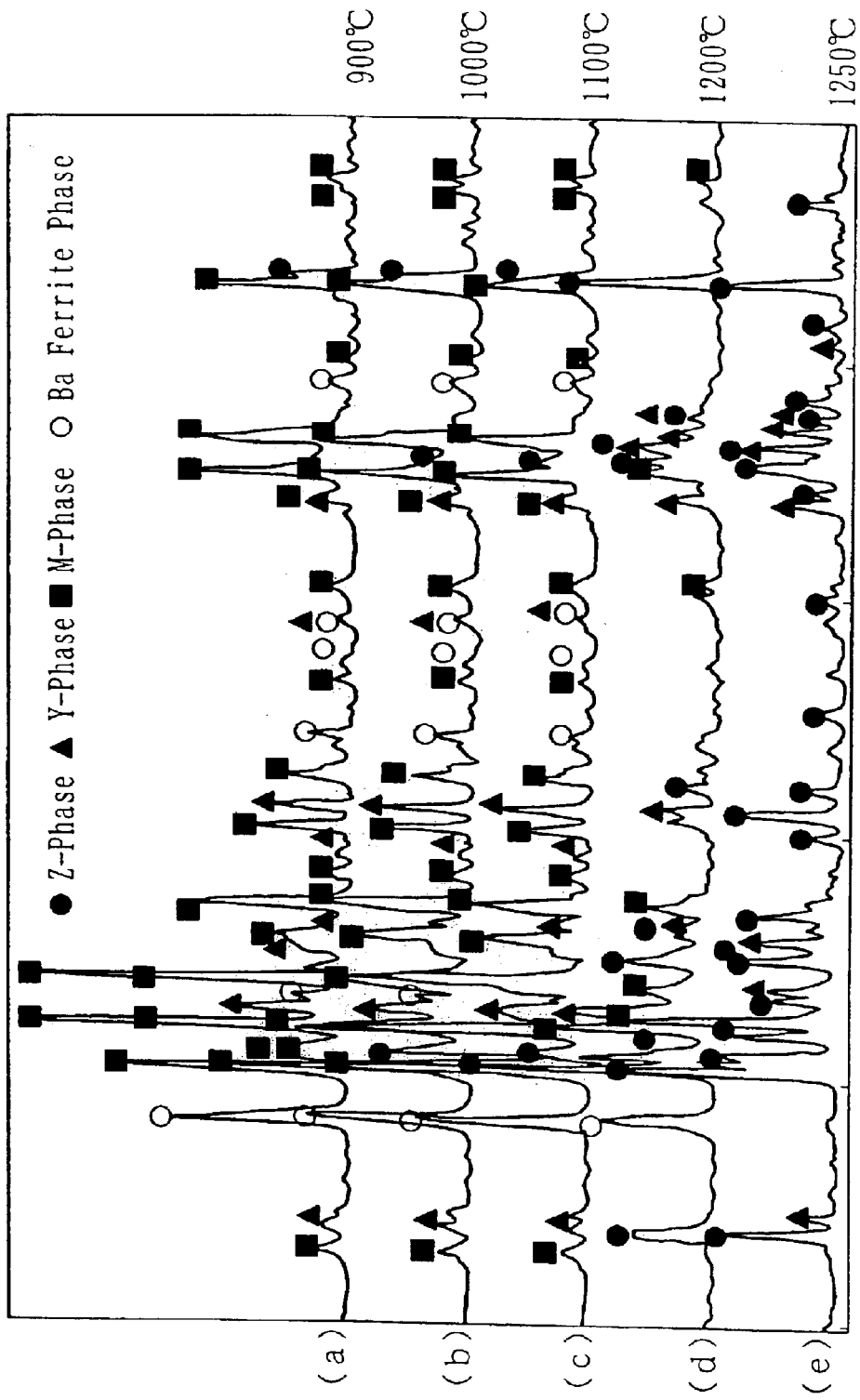
FIG. 14 is a graph showing the X-ray diffraction pattern of the sample No. 23.

Calcining conditions: the sample No. 23=900° C., 1000° C., 1100° C., 1200° C., 1250° C.×2 hours the samples No. 22, No. 24 to No. 25=1200° C., 1250° C.×2 hours Milling time: 90 hours The X-ray diffraction pattern was measured for the powder of the sample No. 23 after sintering at 900° C., 1000° C., 1100° C., 1200° C. and 1250° C. for 2 hours respectively. FIG. 14 shows the results. In FIG. 14, (a) shows the measurement results of the X-ray diffraction pattern in the case of the calcining temperature at 900° C.; (b) in the case of 1000° C.; (c) in the case of 1100° C.; (d) in the case of 1200° C.; and (e) in the case of 1250° C. Note that the conditions for the X-ray diffraction are the same as those of Example 1.

In the case of the calcining temperature at 900° C. (refer to FIG. 14(a)), the M phase, the Ba ferrite phase, the Y phase and the Z phase were identified. At this calcining temperature, the M phase has the highest peak intensity ratio. In the case of the calcining temperature at 1000° C. (refer to FIG. 14(b)) and the case of the calcining temperature at 1100° C. (refer to FIG. 14(c)), the M phase also has the highest peak intensity ratio. However, the peak intensity ratio of the Z phase was the highest at 22.4% in the case of the calcining temperature at 1200° C. (refer to FIG. 14(d)), and it is understood that the Z phase forms the main phase. In addition, in the case of the calcining temperature at 1250° C. (refer to FIG. 14(e)), two phases of the Y phase and the Z phase were identified, and the peak intensity ratio of the Z phase was calculated, which was 49.5%. As described above, to make the Z phase be the main phase when a portion of $Co_3O_4$ was substituted with CuO, the calcining temperature should be desirably at 1220° C. to 1280° C.

Next, toroidal cores were created by using the milled powder of the samples No. 22 to No. 25 after the calcining in the same manner as Example 1. The permeability (500 MHz), the sintered body density, the shrinkage rate in sintering and the permittivity (1 MHz) of the cores were measured. The results in the case of calcining at 1200° C. and the results in the case of calcining at 1250° C. are shown in combination in FIG. 38. Note that the sintering temperature was 930° C. and the sintering time was 2 hours for the both cases.

As shown in FIG. 38, the permeability ($\mu$) of the samples No. 22 to No. 25 was as low as less than 2 in the case of the calcining temperature at 1200° C. Considering that the permeability ($\mu$) of vacuum is 1, the material having the permeability ($\mu$) of 2 or lower is not suitable as the magnetic material. On the other hand, the permeability ($\mu$) of the samples No. 22 to No. 24 in the case of the calcining temperature at 1250° C. showed the good values, which are all 2 or higher. All the values of the sintered body density and the shrinkage rate exceeded the ones in the case of the calcining temperature at 1200° C. Note that the sample No. 25 where $Co_3O_4$ was substituted with CuO by 75% melted when calcined at 1250° C.

As described above, it was found out that good sintered density, shrinkage rate and permeability ($\mu$) could be obtained by calcining at 1250° C. when a portion of $Co_3O_4$ was substituted with CuO.

Figure 15:
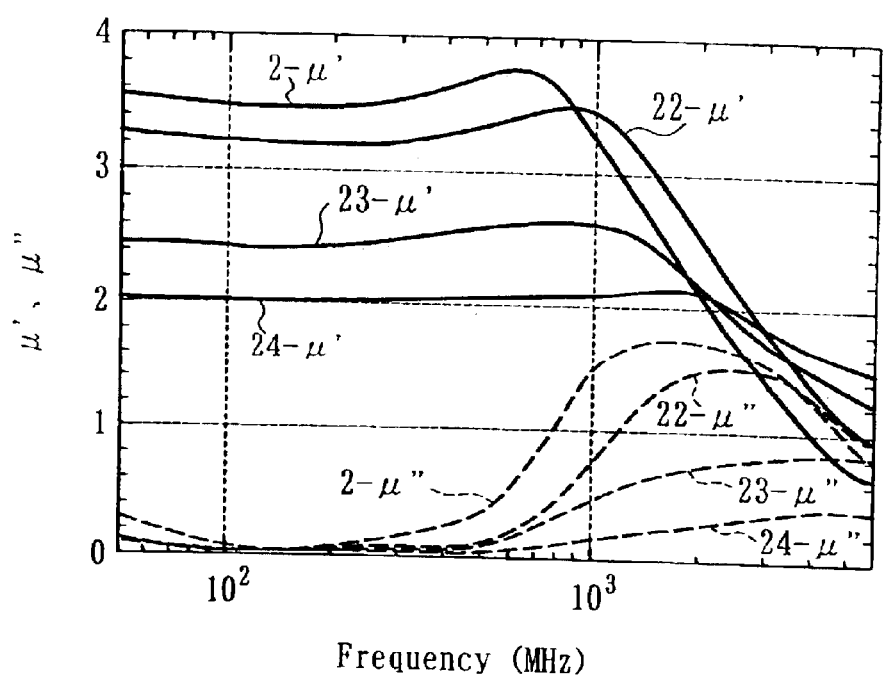
FIG. 15 is a graph showing the frequency characteristics of μ' and μ" of the CuO substitutional material.

Toroidal cores created by using the milled powder of the samples No. 22 and No. 24 calcined at 1250° C. were inserted to the coaxial tube sample holder, and the complex permeability ($\mu'$, $\mu''$) in the high frequency range (50 MHz to 1.8 GHz) was measured by using an impedance analyzer (manufactured by Hewlett-Packard Ltd.). FIG. 15 shows the results together with the measurement result of the sample No. 2. In the toroidal cores by the samples No. 22 to No. 24, the flat portions of $\mu'$ extends to a higher frequency range than that of the sample No. 2, implying that the samples No. 22 to No. 24 can be used in the higher frequency range Particularly, it is noteworthy that the sample No. 22 where a portion of $Co_3O_4$ was substituted with CuO by 5% had $\mu'$ of 3 or higher and its flat portion extends to the higher frequency range.

In FIG. 15, the peak value of $\mu''$ was obtained at the frequency of about 1.5 GHz with regard to the sample No. 2 where a portion of $Co_3O_4$ was not substituted with CuO. On the other hand, the peak value of $\mu''$ was obtained at the frequency of about 2.5 GHz with regard to the sample No. 22 where a portion of $Co_3O_4$ was substituted with CuO (5% substitution); about 4.5 GHz with regard to the sample No. 23 (25% substitution); and about 5.0 GHz with regard to the sample No. 24 (50% substitution). From the above results, it was found out that the peak value of $\mu''$ shifted to the higher frequency side if the amount of substitution increased even when a portion of $Co_3O_4$ was substituted with CuO. Therefore, the peak value of $\mu''$ can be positioned in a desired frequency range by appropriately setting the amount of CuO for substitution similarly to the case where a portion of $Co_3O_4$ was substituted with NiO, MnO, ZnO and MgO. As a desirable amount of substitution in the case where a portion of $Co_3O_4$ is substituted with CuO, it is presumed that the amount of substitution remains in a range that does not exceed 70%. However, more desirably the amount of substitution is from 1% to 60%, and still more desirably from 2% to 30%.

EXAMPLE 5

Calcining and milling were performed after raw material powder was compounded so as to have the composition shown in FIG. 39. In FIG. 39, the samples No. 26 to No. 34 are the examples where a portion of $BaCO_3$ of the sample No. 2 was substituted with $SrCO_3$, and the sample No. 35 is the example where all of $BaCO_3$ of the sample No. 2 was substituted with $SrCO_3$. The conditions for the compounding, the calcining and the milling are shown as follows. FIG. 34 shows the specific surface area of each raw material powder, which is 4.5 $m^2/g$ or more.

Pot for compounding and milling: a stainless steel ball mill pot was used

Medium for compounding and milling: a steel bowl was used

Compounding time: 16 hours

Figure 16:
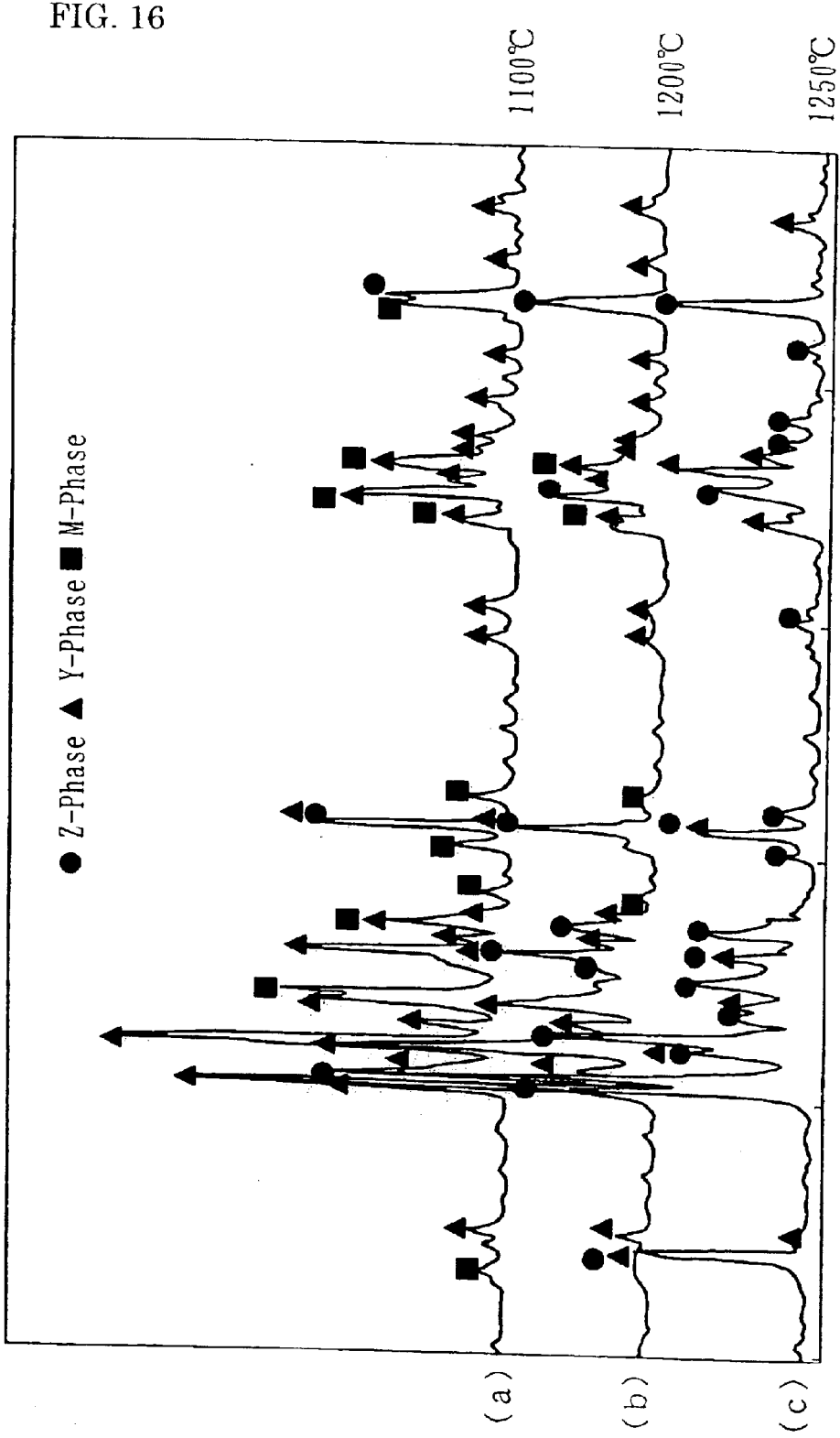
FIG. 16 is a graph showing the X-ray diffraction pattern of the sample No. 31.

Calcining conditions: the samples No. 26 to No. 29=1300° C.×2 hours the samples No. 30, No. 32 to No. 34=1250° C.×2 hours the sample No. 31=1100° C., 1200° C., 1250° C.×2 hours the sample No. 35=1250° C.×2 hours Milling time: 90 hours The X-ray diffraction pattern was measured for the powder of the sample No. 31 after sintering at 1100° C., 1200° C. and 1250° C. for 2 hours. FIG. 16 shows the results. In FIG. 16, (a) shows the measurement result of the X-ray diffraction pattern in the case of the calcining temperature at 1100° C.; (b) in the case of 1200° C.; and (c) in the case of 1250° C. Note that the conditions for the X-ray diffraction are the same as Example 1.

In the case of the calcining temperature at 1100° C. (refer to FIG. 16(a)), two phases of the M phase and the Y phase were identified. At this calcining temperature, the M phase has the highest peak intensity ratio. In the case of the calcining temperature at 1200° C. (refer to FIG. 16(b)), the Z phase was identified in addition to the M phase and the Y phase, and the peak intensity ratio of the Z phase at this calcining temperature is 24.5%. In the case of the calcining temperature at 1250° C. (refer to FIG. 16(c)), the three phases of the M phase, the Y phase and the Z phase were also identified. The peak intensity ratio of the Z phase at this calcining temperature is the highest at 48.3%, and it is understood that the Z phase forms the main phase. As described above, to make the Z phase be the range phase when a portion of $BaCO_3$ was substituted with $SrCO_3$, the calcining temperature may be desirably at 1220° C. to 1280° C.

Next, toroidal cores were created by using the milled powder of the samples No. 26 to No. 35 after the calcining in the same manner as Example 1. The complex permeability (500 MHz), the sintered body density and the shrinkage rate upon sintering of the cores were measured. FIG. 40 shows the results. Note that the sintering temperature was 930° C. and the sintering time was 2 hours for the both cases. Note that the sample No. 35 melted when calcined at 1250° C.

As shown in FIG. 40, the samples No. 26 to No. 31 show good values of the sintered body density of 4.5 g/cm³ or higher and the shrinkage rate of 15% or higher, although the sintered density and the shrinkage rate tend to be lowered as the amount of $SrCO_3$ substituting for a portion of $BaCO_3$ (hereinafter, referred to as "the amount of Sr for substitution") increases. Herein, it is noteworthy that the samples No. 30 and No. 31 show the good sintered body density and the shrinkage rate despite that the calcining was performed at 1250° C. that is 50° C. lower than that of the samples No. 26 to No. 29. As described above, it was found out that sufficient sintered body density and shrinkage rate could be obtained by calcining at 1250° C., when the amount of Sr for substitution is 20% or more.

Figure 17:
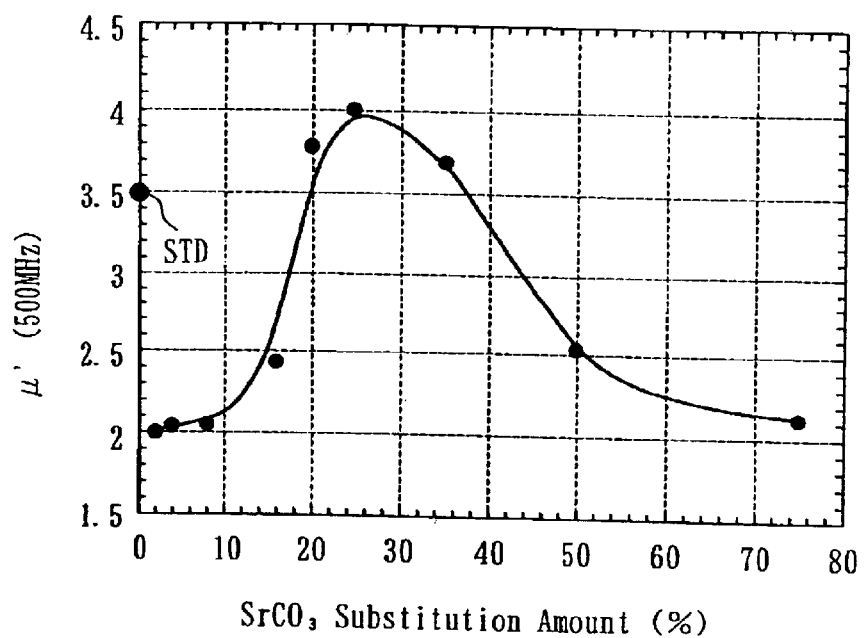
FIG. 17 is a graph showing the relation between an $SrCO_3$ substitution amount and μ'.

Next, the relation between the amount of Sr for substitution and $\mu'$ is shown by using FIG. 40 and FIG. 17. In FIG. 17, when the amount of Sr for substitution is small, $\mu'$ becomes lower than that of the sample No. 2 where no substitution with Sr is performed. However, when the amount of Sr for substitution becomes 20% to 35%, $\mu'$ becomes higher than that of the sample No. 2 where no substitution with Sr is performed, and shows an excellent value of 3.5 or higher. In FIG. 40, $\mu''$ shows substantially the same tendency as $\mu'$, and the samples No. 30 to No. 32 where $BaCO_3$ is substituted with $SrCO_3$ by 20% to 35% show particularly high $\mu''$. From the above results, it was made clear that there existed an optimal amount of Sr for substitution in order to obtain high $\mu'$ and $\mu''$.

Figure 18:
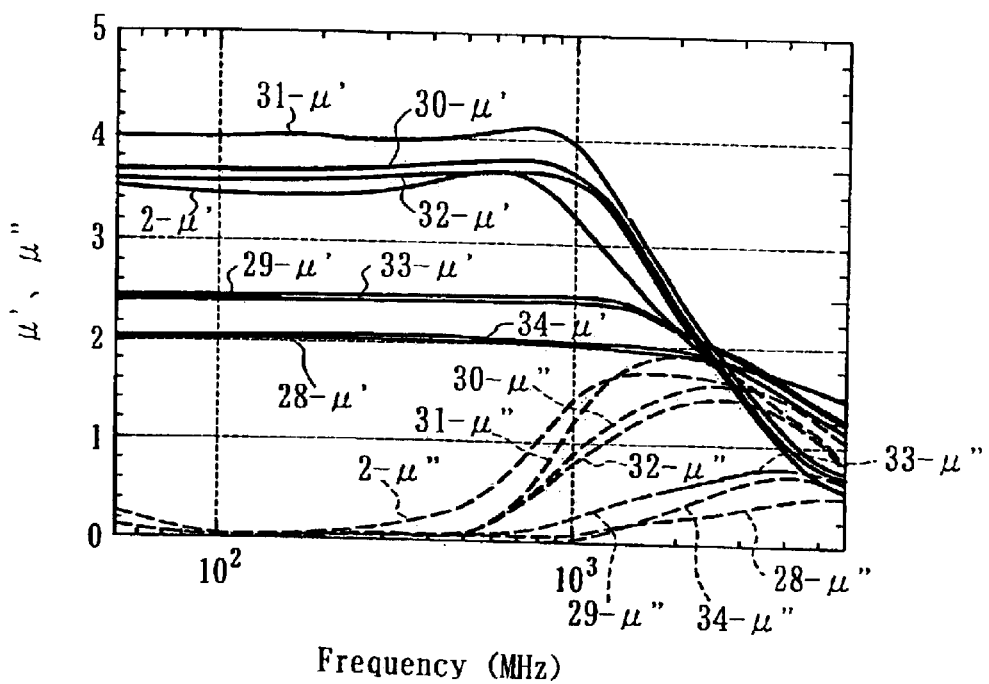
FIG. 18 is a graph showing the frequency characteristics of μ' and μ" of the $SrCO_3$ substitutional material.

Toroidal cores created by using the milled powder of the samples No. 28 and No. 29 that were calcined at 1300° C. and the samples No. 30 to No. 34 that were calcined at 1250° C. were inserted to the coaxial tube sample holder, and the complex permeability ($\mu'$, $\mu''$) in the high frequency range (50 MHz to 1.8 GHz) was measured by using an impedance analyzer (manufactured by Hewlett-Packard Ltd.). FIG. 18 shows the results together with the measurement result of the sample No. 2. In FIG. 18, $\mu'$ of the toroidal cores by the samples No. 30 to No. 32 exceeds that of the sample No. 2 containing no $SrCO_3$, and the flat portions of $\mu'$ extend to a higher frequency range than that of the sample No. 2. Therefore, it was found out that the material having a high permeability and excellent high frequency characteristic could be obtained by substituting $BaCO_3$ with $SrCO_3$ by 20% to 35%. The flat portions of $\mu'$ regarding the samples No. 28, No. 29, No. 33 and No. 34 also extend to the higher frequency range, implying that they can be used in the higher frequency range.

In FIG. 18, the peak value of $\mu''$ for the sample No. 2 containing no $SrCO_3$ was obtained at the frequency of about 1.5 GHz. On the other hand, the peak value of $\mu''$ for the sample No. 28 (8% substitution) where a portion of $BaCO_3$ was substituted with $SrCO_3$ is obtained at the frequency of about 5.5 GHz, and it is understood that the peak value of $\mu''$ shifted to the higher frequency side. Similarly, $\mu''$ of the samples No. 29 to No. 34 were measured, and the peak value of $\mu''$ was obtained at the frequency of 4.0 GHz with regard to the sample No. 29 (16% substitution); 2.6 GHz with regard to the sample No. 30 (20% substitution); 2.0 GHz with regard to the sample No. 31 (25% substitution); 2.8 GHz with regard to the sample No. 32 (35% substitution); 3.8 GHz with regard to the sample No. 33 (50% substitution); and 4.0 GHz with regard to the sample No. 34 (75% substitution). Specifically the peak value of $\mu''$ for the samples No. 28 to No. 34 where a portion of $BaCO_3$ was substituted with $SrCO_3$ is obtained at the frequency of about 2.0 GHz or higher, and the peak value of $\mu''$ shifted to the higher frequency side than the peak value of $\mu''$ of the sample No. 2 containing no $SrCO_3$. From the above results, it was found out that the material having an excellent high frequency characteristic could be obtained by substituting a portion of $BaCO_3$ with $SrCO_3$. A desirable amount of substitution is from 5% to 80%, more desirably from 10% to 60%, and further more desirably from 20% to 35%. A high permeability excellent in high frequency characteristic can be obtained by substituting $BaCO_3$ with $SrCO_3$ by 20% to 35%.

EXAMPLE 6

Figure 19:
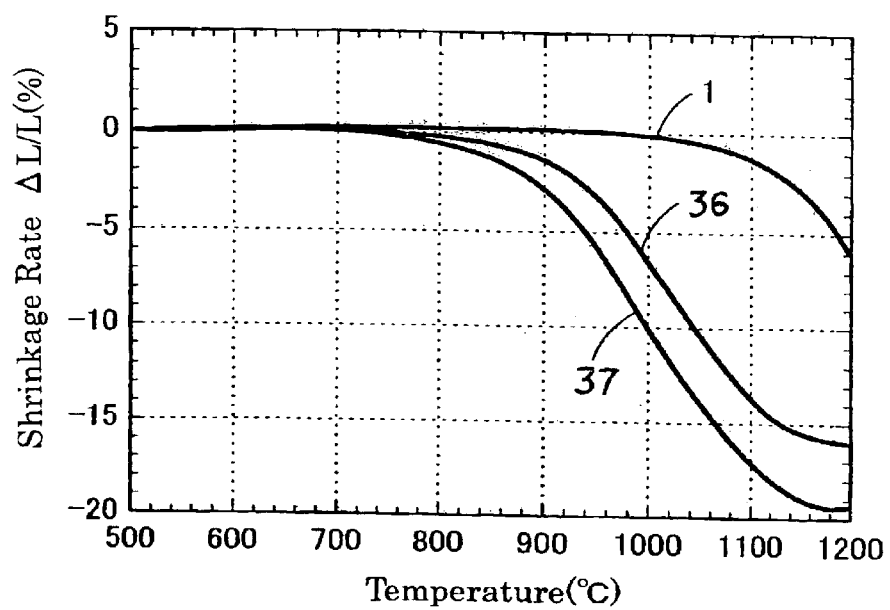
FIG. 19 is a graph showing the temperature shrinkage curves measured in Example 6.

The temperature shrinkage curves were obtained by using the raw material powder having the composition of the samples No. 36 and No. 37 shown in FIG. 41 in the same manner as Example 1. Note that the peak value of the mean grain size distribution of each sample is 1.0 μm, and the specific surface area is 11 m²/g. In addition, glass A and glass B in FIG. 41 denote zinc borosilicate glass, and its composition is as shown in FIG. 42. The obtained temperature shrinkage curves are shown in FIG. 19 together with the temperature shrinkage curve of the sample No. 1. It is understood that the samples No. 36 and No. 37 have the higher shrinkage rate at the same temperature in comparison to that of the sample No. 1. Accordingly, the present invention can contribute to the low temperature sintering by adding borosilicate glass and zinc borosilicate glass.

EXAMPLE 7

Calcining and milling were performed after raw material powder of $Fe_2O_3$, $BaCO_3$ and $Co_3O_4$, which forms the main composition, is compounded so as to have the composition shown in FIG. 43. Sintering aids A to C as $Bi_2O_3$ based glass, or zinc borosilicate glass are added to the calcined powder, wet mixing together with the binder and milling are performed, and the samples No. 38 to No. 50 are obtained (hereinafter, powder obtained in a manner in which the sintering aid such as $Bi_2O_3$ based glass is added to the calcined powder and milled is appropriately referred to as "milled powder"). The samples No. 38 to No. 50 are the hexagonal ferrite. Note that the mean grain size of the raw material powder is: 0.8 μm for $Fe_2O_3$; 1.3 μm for $BaCO_3$; and 3.5 μm for $Co_3O_4$. The compositions of the sintering aids A to C and zinc borosilicate glass are shown in FIG. 44. The conditions for the compounding, the calcining and the milling are shown as follows. In addition, the peak value of the mean grain size distribution for the milled powder of each sample is 1.0 μm, and the specific surface area is 9 m²/g.

Pot for compounding and milling: a stainless steel ball mill pot was used (a polypot was used in milling)

Medium for compounding and milling: a steel bowl was used (a $ZrO_2$ bowl was used in milling)

Compounding time: 16 hours

Calcining conditions: the samples No. 38 to No. 50=1300° C.×2 hours

Milling time: 90 hours

Identification of phases was performed by the X-ray diffraction regarding the milled powder of the sample No. 38 in the following conditions, the X-ray peak intensity ratio of the identified phase was calculated, and thus, the similar tendency as Example 1 was observed.

Moreover, the X-ray diffraction pattern regarding the milled powder of the sample No. 38 was measured after sintering at 910° C. for 2 hours, and the Z phase, the Y phase and the Ba ferrite phase were identified. The Z phase had the highest peak intensity, and it was confirmed that the Z phase formed the main phase.

Next, the shrinkage rate (ΔL/L) was measured by using the milled powder of the samples No. 38 to No. 50 after heated to the predetermined temperature. FIG. 45 shows the results. Note that the shrinkage rate when sintered at 930° C. regarding the samples No. 38 to No. 47 and the shrinkage rate when sintered at 950° C. regarding the samples No. 48 to No. 50 are shown.

FIG. 45 shows that the shrinkage rate improves as the added amount of the sintering aid A (hereinafter, referred to as "sintering aid A amount") increases. This tendency applies to the sintering aid B and C, and the shrinkage rate improves as the added amount of the sintering aid B (hereinafter, referred to as "sintering aid B amount") and the added amount of the sintering aid C (hereinafter, referred to as "sintering aid C amount") increase.

Next, comparison is made between the case where the sintering aids A to C as $Bi_2O_3$ based glass were added (No. 38 to No. 47) and the case where zinc borosilicate glass was added as a sintering aid (No. 48 to No. 50). The shrinkage rate in the case where the sintering aids A to C were added is 11.15% to 16.50%. On the other hand, the shrinkage rate in the case where zinc borosilicate glass was added is 12.30% to 14.12%. Herein, since the shrinkage rate equivalent to that of zinc borosilicate glass with performance of being a sintering aid has been obtained in the case of the sintering aids A to C, it was found out that $Bi_2O_3$ based glass was effective as a sintering aid.

The milled powder of the samples No. 38 to No. 47 was sintered at 930° C. for 2 hours, and the sintered density was measured. The milled powder of the samples No. 48 to No. 50 was sintered at 950° C. for 2 hours, and the sintered body density was measured. FIG. 45 shows the results.

In FIG. 45, all the samples No. 38 to No. 47 where the sintering aids A to C were added show the sintered body density of higher than 4.0 g/cm³. Similarly to the case of the above-described shrinkage rate, the sintered body density improves as the each amount of the sintering aids A to C increases. On the other hand, with regard to zinc borosilicate glass, the sintered body density tends to be lowered as the amount of zinc borosilicate glass (hereinafter, referred to as "zinc borosilicate glass amount") increases.

From the above results, in the case where the sintering aids A to C, that is, $Bi_2O_3$ based glass, are added, it was found out that the shrinkage rate and the sintered body density improve with the increase of the added amount. Specifically, it was made clear that $Bi_2O_3$ based glass was effective as a sintering aid. It is presumed that a desirable added amount of $Bi_2O_3$ based glass is approximately 0.5 wt % to 12 wt %.

Next, samples of a disc shape were manufactured by using the samples No. 38 to No. 47 after milling, and relative resistivity was measured in the conditions shown below. Compounding, calcining and milling were performed to the samples No. 51 to No. 56 having the composition shown in FIG. 43 in the same conditions as described above, and samples of a disc shape were manufactured by using the samples No. 51 to No. 56 after sintering. Then, measurement of the relative resistivity was performed. FIG. 46 shows the measurement results.

Electrodes of In—Ga were provided to the end surfaces of the samples manufactured in the disc shape, and the relative resistivity thereof was measured by using a resistance meter (HP4329A) manufactured by Hewlett-Packard Ltd. by applying a voltage of 25 V for one minute and fifteen seconds. Thereafter, a effective volume of the samples was measured, and the relative resistivity was calculated.

As shown in FIG. 46, in the case where the sintering aids A to C are added (the samples No. 38 to No. 47), the relative resistivity increases as the added amount increases. Particularly, the samples No. 38 to 41 to which the sintering aid A was added show a high relative resistivity of 300 MΩ·cm or higher.

On the other hand, in the case where CuO and $Bi_2O_3$ were singly added (the samples No. 51 to No. 55), the relative resistivity decreased as the added amount of CuO or $Bi_2O_3$ increased. Specifically, the tendency opposite to the case where the sintering aids A to C were added (the samples No. 38 to No. 47) was confirmed.

From the above results, it was found out that a good relative resistivity could be obtained when $Bi_2O_3$ based glass was added and that the relative resistivity tended to increase with the increase of the added amount.

EXAMPLE 8

Example 8 was performed to confirm the effect of the case where $Bi_2O_3$ based glass and CuO are added in combination.

Calcining and milling were performed after raw material powder was compounded so as to have the composition shown in FIG. 47. $Bi_2O_3$ based glass and CuO were added to the calcined powder to obtain the samples No. 57 to No. 65. Note that all of the conditions for compounding, calcining and milling, the mean grain size of the raw material powder of each sample, the peak value of the mean grain size distribution and the specific surface area of the milled powder are the same as Example 7. Herein, the samples No. 57 to No. 59 denote the ones in which CuO was added to the samples No. 38 to No. 40 by 3.0 wt % to 7.0 wt %, the samples No. 60 to No. 62 denote the ones in which CuO was added to the samples No. 42 to No. 44 by 3.0 wt % to 7.0 wt %, and the samples No. 63 to No. 65 denote the ones in which CuO was added to the samples No. 45 to No. 47 by 3.0 wt % to 7.0 wt %.

Figure 20:
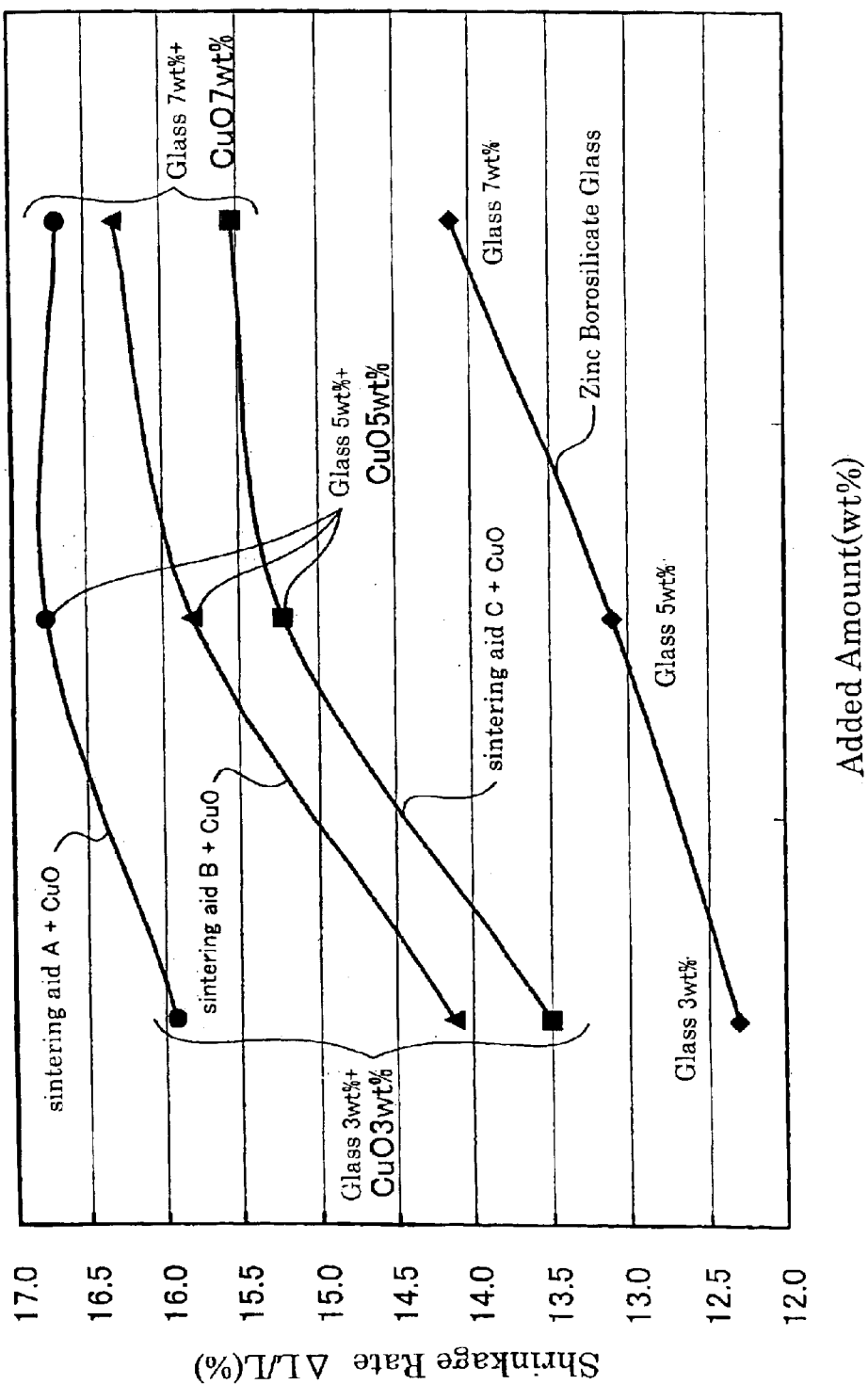
FIG. 20 is a graph showing the temperature shrinkage curves measured in Example 8.

The shrinkage rate (ΔL/L) was measured by using the samples No. 57 to No. 65 when heated to 930° C. The milled powders of the samples No. 57 to No. 65 were sintered at 930° C. for two hours, then the sintered body density was measured. The measurement conditions for the shrinkage rate (ΔL/L) and the sintered body density of the samples No. 57 to No. 65 are the same as Example 7. FIG. 48 shows the results. FIG. 48 also shows the shrinkage rate (ΔL/L) and the sintered body density of the samples No. 38 to No. 40, and No. 42 to No. 48 measured in Example 7 for convenience of comparison. FIG. 20 shows changes of the shrinkage rates by added amount when the sintering aids A to C and CuO were added in combination (the samples No. 57 to No. 65). FIG. 20 also shows the temperature shrinkage curves in the case where zinc borosilicate glass was added by 3.0 wt % to 7.0 wt % as a sintering aid (the samples No. 48 to No. 50) for comparison. Note that the compositions of the samples No. 48 to No. 50 are as shown in FIG. 43, and the compositions of the zinc borosilicate glass are as shown in FIG. 44. The conditions for compounding, milling and calcining, the mean grain size of the raw material powder, the peak value of the mean grain size distribution and the specific surface area of the milled powder with regard to the samples No. 48 to No. 50 are the same as the samples No. 57 to No. 65.

In FIG. 20, regarding the curves of the sintering aid A+CuO, the sintering aid B+CuO and the sintering aid C+CuO, the shrinkage rate is the highest in A, followed by B, then C. Here, as seen in FIG. 44, the sintering aid A contains the largest amount of $Bi_2O_3$, followed by the sintering aid B, then the sintering aid C among the sintering aids A to C. Therefore, the content of $Bi_2O_3$ in $Bi_2O_3$ based glass and the shrinkage rate are in proportional relation.

Next, the sintered body samples of a toroidal shape were manufactured by using the milled powder of the samples No. 38 to No. 40, No. 42 to No. 47 and No. 57 to No. 65 shown in FIG. 47. The manufactured toroidal cores were inserted to a coaxial tube sample holder, and the complex permeability ($\mu'$, $\mu''$) in a high frequency range (1 MHz to 1.8 GHz) was measured by using the impedance analyzer (HP4291A, manufactured by Hewlett-Packard Ltd.). Note that the toroidal cores were created by sintering at 930° C. for 2 hours with regard to each sample.

In FIG. 48, when looking at the column of the real part $\mu'$ (hereinafter, referred to as $\mu'$ as appropriate) of the complex permeability, the $\mu'$ in the case where the sintering aids A to C are singly added (the samples No. 38 to No. 40, and No. 42 to No. 47) is 2.25 to 3.81. Considering that the permeability $\mu'$ in a vacuum is 1, the material having the permeability $\mu'$ of 2 or higher can be used as a magnetic material. Accordingly, it was found out that a predetermined magnetic properties of the magnetic ferrite material was maintained even when the sintering aids A to C, that is, $Bi_2O_3$ based glass was added.

Next, when the sample No. 40 and the sample No. 57 are compared, $\mu'$ of the sample No. 40 is 2.25, and $\mu'$ of the sample No. 57 is 3.12. Here, the sintering aid A is added to the sample No. 40 by 7.0 wt %, and the sintering aid A and CuO are added to the sample No. 57 by 3.0 wt % respectively, that is, 6.0 wt % in total. The sample No. 57 having the total amount of additive of 6.0 wt % shows higher $\mu'$ than $\mu'$ of the sample No. 40 having the total amount of additive of 7.0 wt %. Therefore, it was found out that a smaller added amount could increase $\mu'$ when the sintering aid A and CuO were added in combination. The same thing as the sample No. 39 and the sample No. 57 applies to the samples No. 44 and No. 60, and the samples No. 47 and No. 63.

The following tendency has been shown with regard to the imaginary part $\mu''$ (hereinafter, referred to as $\mu''$ as appropriate) of complex permeability. Specifically, the permeability $\mu''$ of the samples No. 57 to No. 65 to which the sintering aids A to C and CuO were added in combination improved in comparison with the cases where only the sintering aids A to C were added (the samples No. 38 to No. 40, and No. 42 to No. 47).

From the above results, it was found out that the permeability $\mu'$ and $\mu''$ improved when $Bi_2O_3$ based glass and CuO were added in combination in comparison with the case where only $Bi_2O_3$ based glass was added. Th obtain good permeability $\mu'$ and $\mu''$, it is desirable that $Bi_2O_3$ based glass and CuO are added by 1 wt % to 20 wt % in total, more desirably about 3 wt % to 15 wt %.

EXAMPLE 9

Figure 21:
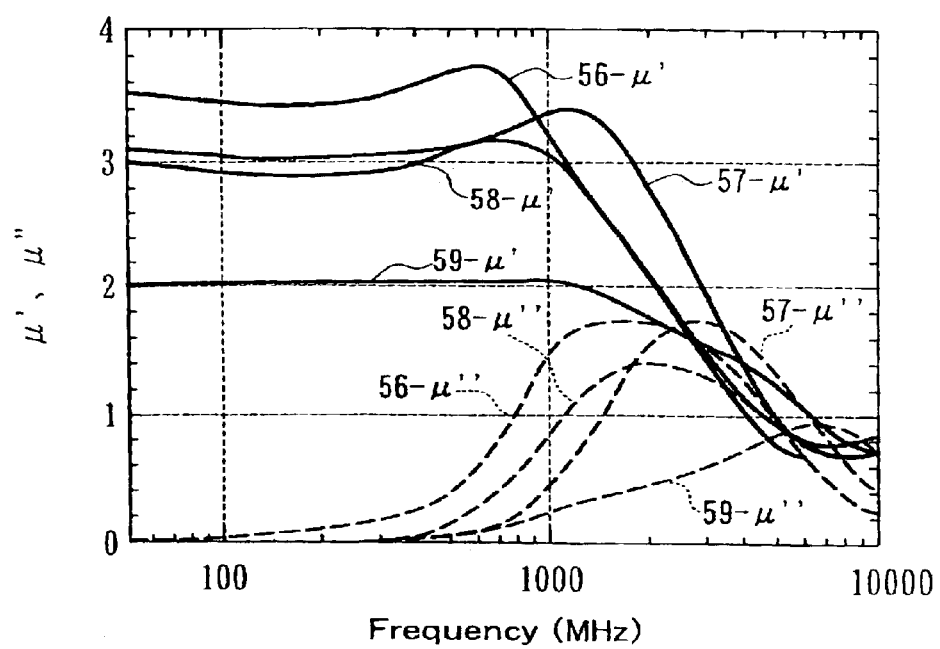
FIG. 21 is a graph showing the frequency characteristics of $\mu'$ and $\mu''$ of samples No. 56 to No. 59.
Figure 22:
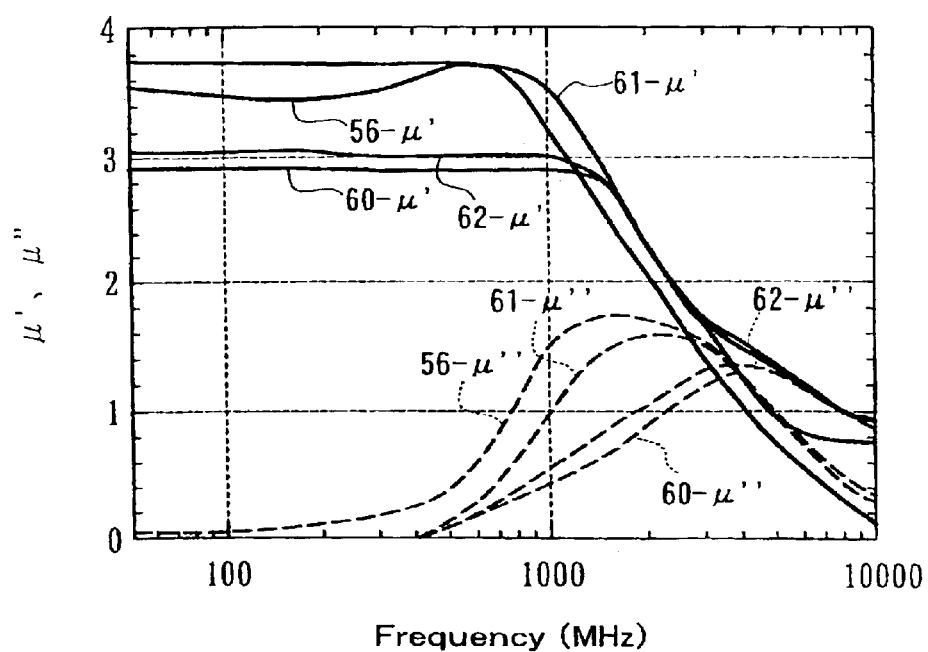
FIG. 22 is a graph showing the frequency characteristics of $\mu'$ and $\mu''$ of samples No. 56 and No. 60 to No. 62.
Figure 23:
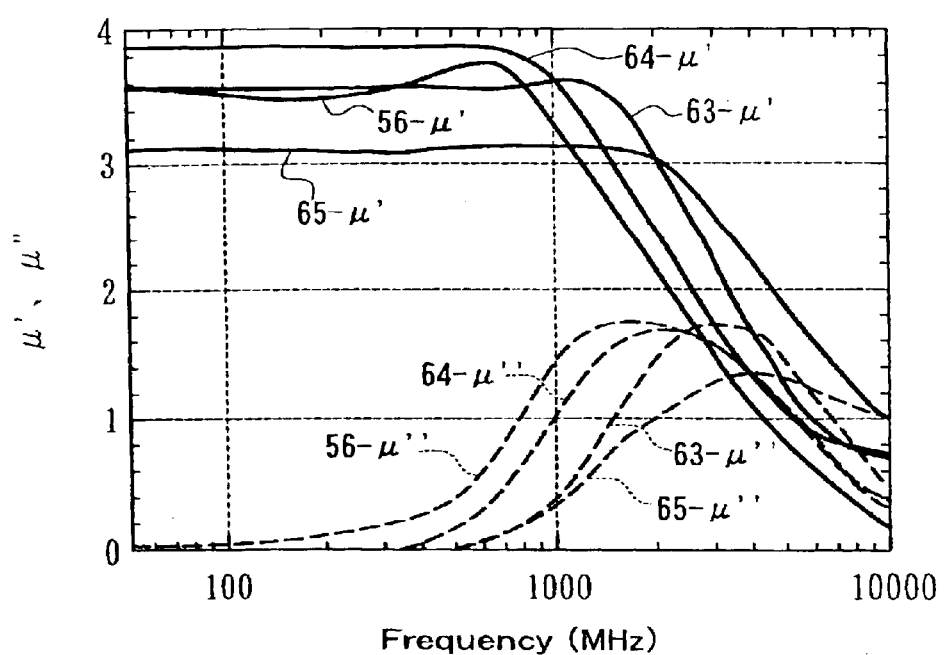
FIG. 23 is a graph showing the frequency characteristics of $\mu'$ and $\mu''$ of samples No. 56 and No. 63 to No. 65.

Cores of a toroidal shape were created by using the milled powder of the samples No. 57 to No. 59 (the sintering aid A+CuO), the samples No. 60 to No. 62 (the sintering aid B+CuO) and the samples No. 63 to No. 65 (the sintering aid C+CuO) in the same step as Example 8. The peak value of the mean grain size distribution of each sample is 1.0 $\mu$m and the specific surface area is 9 m$^2$/g. The permeability of the obtained cores was measured in the same manner as Example 8. Note that the measurement was performed for the frequency range up to 10 GHz in Example 9. FIG. 21 to FIG. 23 show the results together with the measurement result of the sample No. 56 ($Bi_2O_3$ and CuO were added by 5 wt % respectively). FIG. 21 is a graph showing the frequency characteristics of $\mu'$ and $\mu''$ of the samples No. 56, and 57 to 59. FIG. 22 is a graph showing the frequency characteristics of $\mu'$ and $\mu''$ of the samples No. 56, and No. 60 to No. 62. FIG. 23 is a graph showing the frequency characteristics of $\mu'$ and $\mu''$ of the samples No. 56, and No. 63 to No. 65. Note that the indication of 56-$\mu'$ in FIG. 21 to FIG. 23 denotes a real part of the complex permeability of the sample No. 56, and the indication of 56-$\mu''$ denotes an imaginary part of the complex permeability of sample No. 56. The same applies to the other samples.

In FIG. 21, with regard to the toroidal cores by the samples No. 57 to No. 59, the flat portions of $\mu'$ extends to a higher frequency range than that of the sample No. 56, implying that the samples No. 57 to No. 59 can be used in the higher frequency range.

The peak value of $\mu''$ was obtained at the frequency of about 1.5 GHz with regard to the sample No. 56 to which $Bi_2O_3$ based glass was not added. On the contrary, the peak value of $\mu''$ regarding the sample No. 57 (the sintering aid A and CuO were added by 3 wt % respectively) was obtained at the frequency of about 2.8 GHz, the peak value of $\mu''$ regarding the sample No. 58 (the sintering aid A and CuO were added by 5 wt % respectively) was obtained at the frequency of about 2.0 GHz, and the peak value of $\mu''$ regarding the sample No. 59 (the sintering aid A and CuO were added by 7 wt % respectively) was obtained at the frequency of about 7.0 GHz.

Here, comparing the sample No. 56 ($Bi_2O_3$ and CuO were added by 5 wt % respectively) with the sample No. 58 (the sintering aid A and CuO were added by 5 wt % respectively), the both have the equal main composition, and the CuO amount as the sintering aid is 5 wt % and the total amount of the sintering aids is 10 wt %, which are common to the both. Therefore, it is considered that addition of the sintering aid A, that is, $Bi_2O_3$ based glass made the peak value of $\mu''$ regarding the sample No. 58 shift to the higher frequency side than the peak value of $\mu''$ regarding the sample No. 56.

FIG. 22 and FIG. 23 have the similar tendencies as above. In FIG. 22, the peak value of $\mu''$ regarding the sample No. 56 to which $Bi_2O_3$ based glass was not added was obtained at the frequency of about 1.5 GHz. On the contrary, the peak value of $\mu''$ regarding the sample No. 60 (the sintering aid B and CuO were added by 3 wt % respectively) was obtained at the frequency of about 4.0 GHz. In addition, the peak value of $\mu''$ regarding the sample No. 61 (the sintering aid B and CuO were added by 5 wt % respectively) was obtained at the frequency of about 2.0 GHz, and the peak value of $\mu''$ regarding the sample No. 62 (the sintering aid B and CuO were added by 7 wt % respectively) was obtained at the frequency of about 3.0 GHz. Here, comparing the sample No. 56 ($Bi_2O_3$ and CuO were added by 5 wt % respectively) with the sample No. 61 (the sintering aid B and CuO were added by 5 wt % respectively), the peak value of $\mu''$ regarding the sample No. 61 shifts to the higher frequency side than the peak value of $\mu''$ regarding the sample No. 56 similarly to the above-described case.

Further, in FIG. 23, the peak value of $\mu''$ regarding the sample No. 63 (the sintering aid C and CuO were added by 3 wt % respectively) was obtained at the frequency of about 3.0 GHz, the peak value of $\mu''$ regarding the sample No. 64 (the sintering aid C and CuO were added by 5 wt % respectively) was obtained at the frequency of about 2.0 GHz, and the peak value of $\mu''$ regarding the sample No. 65 (the sintering aid C and CuO were added by 7 wt % respectively) was obtained at the frequency of about 4.0 GHz. In other words, the peak value of $\mu''$ shifts to the higher frequency side with regard to the sintering aids B and C similarly to the case of the sintering aid A. Particularly, in the sample No. 61 to which the sintering aid B and CuO were added by 5 wt % respectively and the sample No. 62 to which the sintering aid C and CuO were added by 5 wt % respectively, it is noteworthy that the permeability is high as well as the peak value shifts to the higher frequency side.

From the above results, it was found out that the magnetic ferrite material having an excellent high frequency characteristic could be obtained by adding $Bi_2O_3$ based glass and CuO by 3 wt % respectively, in total of 6 wt % to 14 wt %. As a combined added amount of $Bi_2O_3$ based glass and CuO, it is considered that from 1 wt % to 20 wt %, more desirably from 3 wt % to 15 wt %, and further more desirably from 6 wt % to 14 wt % may be added. In the case where $Bi_2O_3$ based glass and CuO are added by 8 wt % to 12 wt % in total, not only the effect that the peak value of $\mu''$ shifts to the higher frequency side, but also the high permeability $\mu''$ of 3 or higher can be obtained.

Next, the relation between the added amount of $Bi_2O_3$ based glass and CuO and a cross point will be described by using FIG. 24 to FIG. 26. Here, the cross point refers to an intersection point of the real part $\mu'$ of the complex permeability and the imaginary part $\mu''$ of the complex permeability. Note that the straight lines in FIG. 24 to FIG. 26 show a tendency in the case where the sintering aids A to C and CuO are added in combination.

Figure 24:
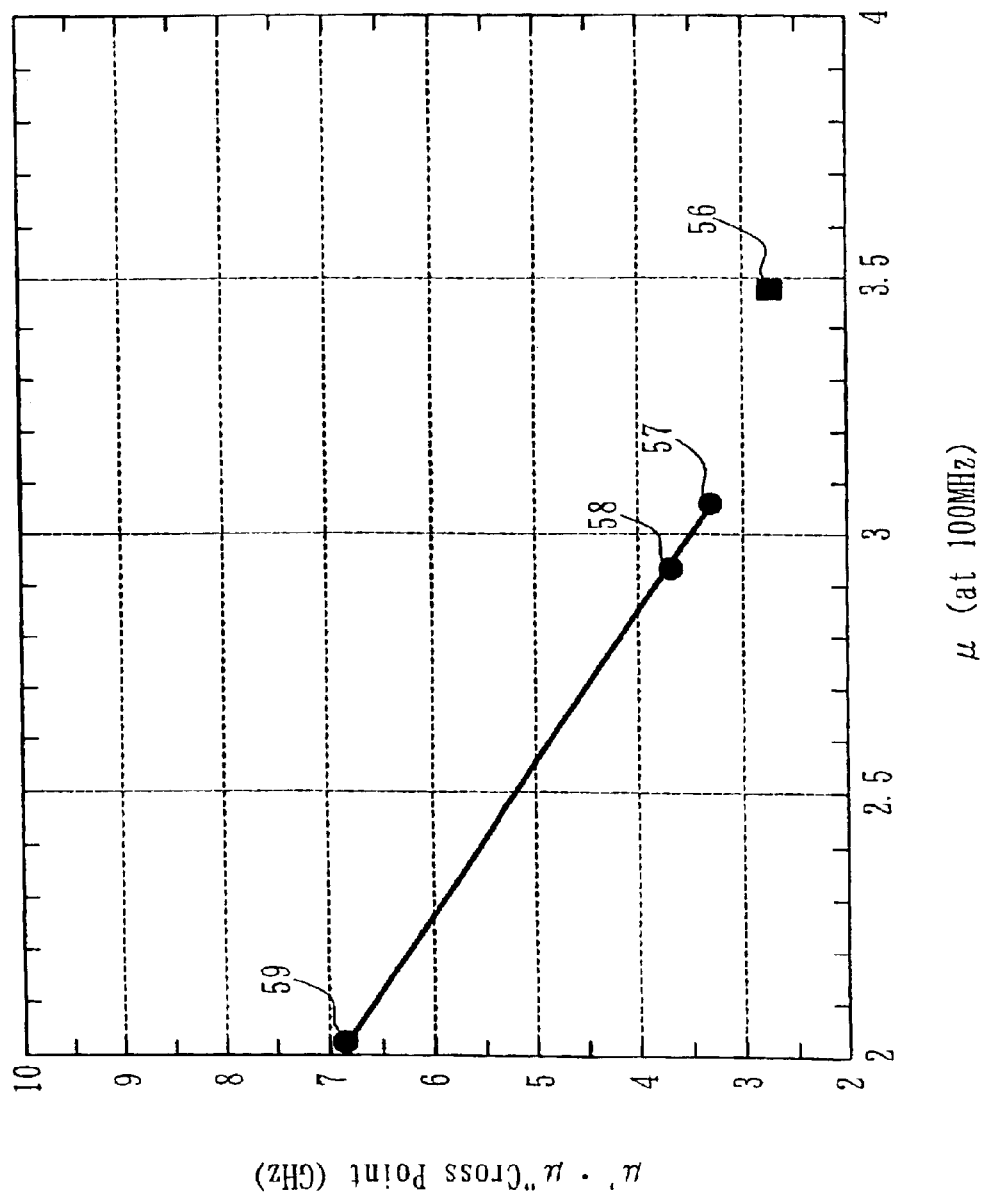
FIG. 24 is a graph showing the cross points of the samples 56 to 59.
Figure 25:
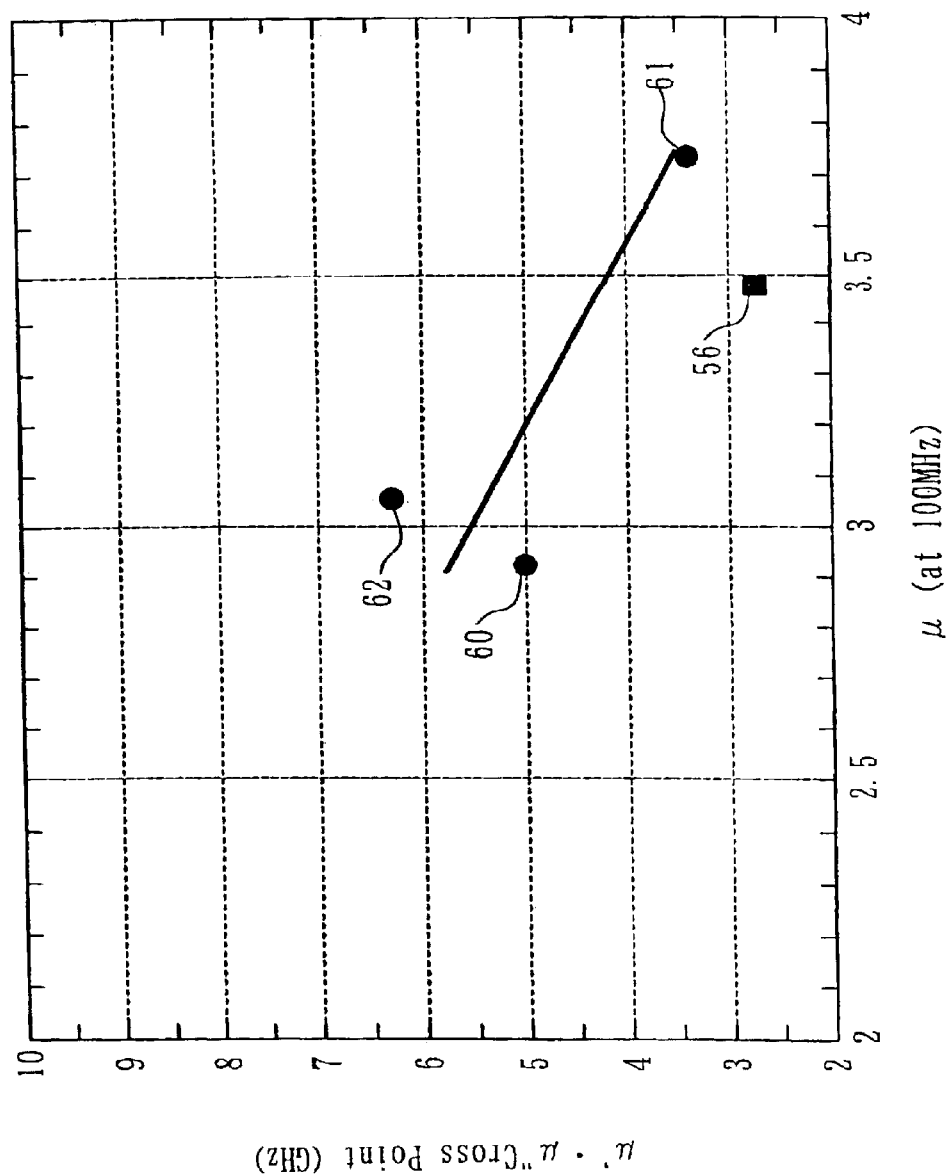
FIG. 25 is a graph showing the cross points of the samples 56 and 60 to 62.
Figure 26:
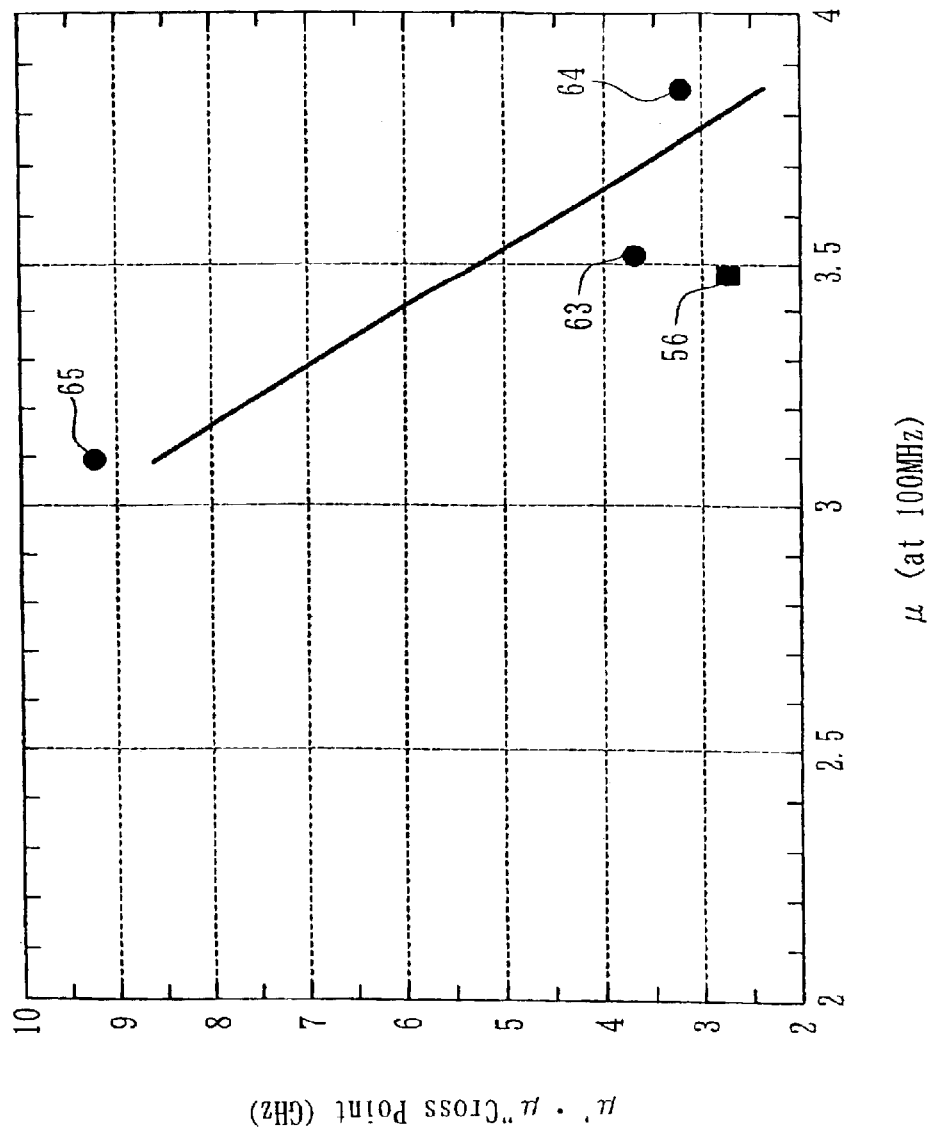
FIG. 26 is a graph showing the cross points of the samples 56 and 63 to 65.

In FIG. 24 to FIG. 26, all of the cross points of the samples No. 57 to No. 59 (the sintering aid A+CuO), the samples No. 60 to No. 62 (the sintering aid B+CuO), and the samples No. 63 to No. 65 (the sintering aid C+CuO) are higher than that of the sample No. 56 ($Bi_2O_3$ and CuO are added by 5 wt % respectively) to which $Bi_2O_3$ based glass is not added. Particularly, it is noteworthy that $\mu$ of the sample No. 61 (the sintering aid B and CuO were added by 5 wt % respectively) of FIG. 25, the sample No. 63 (the sintering aid C and CuO were added by 3 wt % respectively) of FIG. 26, and the sample No. 64 (the sintering aid C and CuO were added by 5 wt % respectively) is very high, such as 3.5 or higher and shifts to the higher frequency side.

The cross points are obtained at a position of the frequency about 5.0 GHz or higher with regard to the sample No. 59 (the sintering aid A and CuO were added by 7 wt % respectively) of FIG. 24, the sample No. 60 (the sintering aid B and CuO were added by 3 wt % respectively) and the sample No. 62 (the sintering aid B and CuO were added by 7 wt % respectively) of FIG. 25, and the sample No. 65 (the sintering aid C and CuO were added by 7 wt % respectively) of FIG. 26. Accordingly, it can be concluded that these samples can be used in a considerably high frequency range.

In this example, it was found out that adding $Bi_2O_3$ based glass made the cross points, i.e., the intersection point of $\mu'$ and $\mu''$, shift to the higher frequency side. Moreover, the peak value of $\mu'$ and $\mu''$ can be positioned in a desired frequency range by appropriately setting the added amount of $Bi_2O_3$ based glass.

FIG. 49 shows the permittivity $\epsilon$ of the samples No. 38 to No. 40, No. 42 to No. 47, and No. 57 to No. 65 to which $Bi_2O_3$ based glass was added, and the sample No. 56 to which $Bi_2O_3$ based glass was not added.

In FIG. 49, the permittivity $\epsilon$ of the sample No. 56 ($Bi_2O_3$ and CuO were added by 5 wt % respectively) is 40. On the other hand, it was found out that the permittivity $\epsilon$ of the samples No. 38 to No. 40, No. 42 to No. 47, and No. 57 to No. 65 to which $Bi_2O_3$ based glass was added undergoes a transition in the range from 20 to 30.

FIG. 27(a) and FIG. 27(b) show a concept of the microstructure of sintered body of this example. $Bi_2O_3$ based glass mainly exists at the triple points (shown as the black dots in the drawing) in the microstructure of sintered body as shown in FIG. 27(a). For example, at the triple points ① to ③, the content of each material constituting $Bi_2O_3$ based glass becomes substantially uniform. In other words, the content of $Bi_2O_3$ for example, at the triple points ① to ③, becomes substantially constant as shown in FIG. 27(b). Note that, in FIG. 27(b), the axis of abscissas shows the position of the triple point, and the axis of ordinates shows the concentration of the concerned material. The same applies to other constituent materials.

On the contrary, FIG. 28(a) and FIG. 28(b) show a conceptional view of the microstructure of sintered body in the case where each material constituting $Bi_2O_3$ based glass, for example, is independently added. This is the same as the example where $Bi_2O_3$ based glass is added, in terms of existence of each material constituting $Bi_2O_3$ based glass mainly at the triple points (shown as the black dots in the drawing) in the microstructure of sintered body shown in FIG. 28(a). However, the content of each material becomes uneven at every triple point when each material is added independently. For example, as shown in FIG. 28(b), the content of $Bi_2O_3$ would be different at the triple point ④, the triple point ⑤, and the triple point ⑥.

Accordingly, addition of $Bi_2O_3$ based glass can be identified by using the TEM-EDX.

Field of Industrial Application

As described above in detail, a multilayer ferrite chip component comprising a magnetic ferrite layer where Z phase forms a main phase can be provided according to the present invention.

What is claimed is:

1. Magnetic ferrite powder, wherein a peak intensity ratio of Z phase ($M_3Me_2Fe_{24}O_{41}$: M=one or more kinds of alkaline-earth metal, Me=one or more kinds selected from Co, Ni, Mn, Zn, Mg and Cu) of hexagonal ferrite is 30% or higher in X-ray diffraction, and a peak value of grain size distribution is within a range from 0.1 $\mu$m to 3 $\mu$m.

2. The magnetic ferrite powder according to claim 1, wherein one or more kinds selected from borosilicate glass, zinc borosilicate glass, $Bi_2O_3$ based glass, CuO and $Bi_2O_3$ are added by 0.5 wt % to 20 wt %.

3. The magnetic ferrite powder according to claim 1, wherein CuO and $Bi_2O_3$ are added by 0.5 wt % to 20 wt % in total.

4. The magnetic ferrite powder according to claim 1, wherein $Bi_2O_3$ based glass and CuO are added by 3 wt % to 15 wt % in total.

5. The magnetic ferrite powder according to claim 1, wherein $Bi_2O_3$ based glass is added by 3 wt % to 7 wt %, and CuO is added by 3 wt % to 7 wt %.

6. Magnetic ferrite powder, wherein Z phase (where M=Ba, Me=one or more kinds selected from Co, Ni, Mn, Zn, Mg and Cu) indicated as $M_3Me_2Fe_{24}O_{41}$ forms a main phase, and a powder specific surface area is from 5 $m^2$/g to 30 $m^2$/g.

7. The magnetic ferrite powder according to claim 6, wherein a portion of Ba is substituted with Sr.

8. A sintered body of magnetic ferrite,
wherein a Z phase (M=Ba, Me=one or more kinds selected from Co, Ni, Mn, Zn, Mg and Cu) indicated as $M_3Me_2Fe_{24}O_{41}$ forms a main phase,
CuO and $Bi_2O_3$ are included by 0.5 wt % to 20 wt % in total,
CuO mainly exists within grains, and
$Bi_2O_3$ mainly exists at grain boundaries.

9. The sintered body of magnetic ferrite according to claim 8,
wherein a portion of Ba is substituted with Sr.

10. Sintered body of magnetic ferrite,
wherein Z phase (where M=Ba, Me=one or more kinds selected from Co, Ni, Mn, Zn, Mg and Cu) indicated as $M_3Me_2Fe_{24}O_{41}$ forms a main phase, and
$Bi_2O_3$ based glass and CuO are added by 1 wt % to 20 wt % in total.

11. A multilayer ferrite chip component in which a magnetic ferrite layer and an internal electrode are stacked alternately, the multilayer ferrite chip component comprising an external electrode electrically connected with said internal electrode,
wherein said magnetic ferrite layer has Z phase ($M_3Me_2Fe_{24}O_{41}$: M=one or more kinds of alkaline-earth metal, Me=one or more kinds selected from Co, Ni, Mn, Zn, Mg and Cu) of hexagonal ferrite as a main phase in X-ray diffraction, the magnetic ferrite layer being constituted of sintered body of magnetic ferrite having a mean grain size of 1 to 5 $\mu$m, and
said internal electrode is constituted of any one of Ag and an Ag alloy.

12. The multilayer ferrite chip component according to claim 11,
wherein said multilayer ferrite chip component is formed by co-firing said magnetic ferrite layer and said internal electrode layer, and
density of said magnetic ferrite layer is 5 g/cm$^3$ or higher.

13. The multilayer ferrite chip component according to claim 11,
wherein said magnetic ferrite layer includes CuO and $Bi_2O_3$ by 0.5 wt % to 20 wt % in total,
CuO mainly exists within grains, and
$Bi_2O_3$ mainly exists at grain boundaries.

14. The multilayer ferrite chip component according to claim 11,
wherein said magnetic ferrite layer includes $Bi_2O_3$ based glass and CuO by 1 wt % to 20 wt % in total.

15. A manufacturing method of a multilayer ferrite chip component in which a magnetic ferrite layer and an internal electrode are stacked, comprising the steps of:
mixing raw material powder of magnetic ferrite;
calcining the mixed raw material powder in a temperature range of 1200° C. or higher;
milling the obtained calcined body so as to make a peak value of grain size distribution fall into a range from 0.1 to 3 $\mu$m;
obtaining a sheet or paste for forming a magnetic layer by using the obtained milled powder;
obtaining a laminated green body by alternately stacking material for the internal electrode and any one of said sheet and said paste; and
sintering said laminated green body at a temperature lower than 960° C.,
wherein said magnetic ferrite layer consists of sintered body of magnetic ferrite having a peak intensity ratio of Z phase ($M_3Me_2Fe_{24}O_{41}$: M=one or more kinds of alkaline-earth metal, Me=one or more kinds selected from Co, Ni, Mn, Zn, Mg and Cu) of hexagonal ferrite at 30% or greater in X-ray diffraction.

16. The manufacturing method of the multilayer ferrite chip component according to claim 15,
wherein a powder specific surface area of each of said raw material powder is 4.5 m$^2$/g or more.

17. The manufacturing method of the multilayer ferrite chip component according to claim 15,
wherein a powder specific surface area of said milled powder is in a range from 8 m$^2$/g to 20 m$^2$/g.

* * * * *

UNITED STATES PATENT AND TRADEMARK OFFICE
CERTIFICATE OF CORRECTION

PATENT NO.    : 6,749,768 B2
DATED         : June 15, 2004
INVENTOR(S)   : Masami Endo et al.

It is certified that error appears in the above-identified patent and that said Letters Patent is hereby corrected as shown below:

Column 17,
Line 60, please delete "Gllz" and insert therefor -- GHz --.

Column 21,
Line 51, please delete "Th" and insert therefor -- To --.

Signed and Sealed this

Sixteenth Day of November, 2004

JON W. DUDAS
*Director of the United States Patent and Trademark Office*